United States Patent
Swatko et al.

(10) Patent No.: US 9,681,041 B1
(45) Date of Patent: Jun. 13, 2017

(54) APPARATUS, SYSTEM AND METHOD FOR CAPTURING AND COMPOSITING AN IMAGE USING A LIGHT-EMITTING BACKDROP

(71) Applicants: Michael Andrew Swatko, Wilton, NH (US); Carl D. Sundheim, Hampstead, NH (US); Jason M. Riley, Windham, NH (US); Peter J. Boyle, Bedford, NH (US); P. Stephen Vail, Georgetown, MA (US)

(72) Inventors: Michael Andrew Swatko, Wilton, NH (US); Carl D. Sundheim, Hampstead, NH (US); Jason M. Riley, Windham, NH (US); Peter J. Boyle, Bedford, NH (US); P. Stephen Vail, Georgetown, MA (US)

(73) Assignee: Foto Fantasy, Inc., Salem, NH (US)

( * ) Notice: Subject to any disclaimer, the term of this patent is extended or adjusted under 35 U.S.C. 154(b) by 0 days.

(21) Appl. No.: 13/668,201

(22) Filed: Nov. 2, 2012

(51) Int. Cl.
| | |
|---|---|
| G03B 15/00 | (2006.01) |
| H04N 5/232 | (2006.01) |
| H04N 1/00 | (2006.01) |
| H04N 1/21 | (2006.01) |
| H04N 5/225 | (2006.01) |

(52) U.S. Cl.
CPC ..... *H04N 5/23222* (2013.01); *H04N 1/00411* (2013.01); *H04N 1/00442* (2013.01); *H04N 1/2154* (2013.01); *H04N 5/2252* (2013.01)

(58) Field of Classification Search
USPC ........................................... 396/2–4
See application file for complete search history.

(56) References Cited

U.S. PATENT DOCUMENTS

| | | | |
|---|---|---|---|
| 5,070,397 A | 12/1991 | Wedderburn-Bisshop | 358/22 |
| 5,117,283 A | 5/1992 | Kroos et al. | 358/22 |
| 5,343,386 A * | 8/1994 | Barber | G07F 17/26 |
| | | | 348/E7.085 |
| 5,574,511 A | 11/1996 | Yang et al. | 348/586 |
| 5,623,581 A * | 4/1997 | Attenberg | 358/1.6 |
| D388,451 S | 12/1997 | Massarsky | |
| 5,986,718 A | 11/1999 | Barwacz et al. | 348/592 |

(Continued)

FOREIGN PATENT DOCUMENTS

JP    2001086288    3/2001    ............ G03B 17/53

*Primary Examiner* — Clayton E LaBalle
*Assistant Examiner* — Warren K Fenwick
(74) *Attorney, Agent, or Firm* — Pollack, P.C.

(57) ABSTRACT

An apparatus, system and method are disclosed for photographing an image in a photo booth employing a light-emitting backdrop. For example, the apparatus comprises a photo booth including a housing having an entrance on one side with movable closure member to minimize encroachment of exterior light, a seat, a first white light source facing the subject(s) for emitting a first selected light intensity upon the subjects, a second white light emitting source facing generally the rear of the subject(s) so as to provide a light-emitting photographic backdrop, and a device for receiving a selected form of payment, or alternatively, for activating the apparatus without payment. In addition, the apparatus includes a photography unit comprising a selected camera, a program-controlled apparatus, a printer, and the first light source, for taking a digital photograph of objects within a selected frame of reference.

1 Claim, 19 Drawing Sheets

(56) References Cited

U.S. PATENT DOCUMENTS

| | | | | |
|---|---|---|---|---|
| 6,021,417 | A | 2/2000 | Massarksy | 707/502 |
| 6,229,904 | B1 | 5/2001 | Huang et al. | 382/100 |
| 6,385,628 | B1* | 5/2002 | Massarsky | G06Q 10/10 |
| | | | | 709/201 |
| 6,421,462 | B1* | 7/2002 | Christian et al. | 382/219 |
| 6,507,361 | B1* | 1/2003 | Barber | 348/207.2 |
| 6,619,860 | B1 | 9/2003 | Simon | 395/101 |
| 6,718,123 | B1 | 4/2004 | Massarsky | 386/117 |
| 6,791,723 | B1* | 9/2004 | Vallmajo et al. | 358/488 |
| 7,321,724 | B2* | 1/2008 | Kito | G03B 15/08 |
| | | | | 355/40 |
| 7,418,197 | B2* | 8/2008 | Didow et al. | 396/3 |
| 7,952,107 | B2* | 5/2011 | Daniels et al. | 257/80 |
| RE42,881 | E* | 11/2011 | Vallmajo et al. | 358/488 |
| 2002/0154905 | A1* | 10/2002 | Maeda et al. | 396/2 |
| 2004/0081440 | A1* | 4/2004 | Miwa et al. | 396/2 |
| 2006/0083500 | A1 | 4/2006 | Kito | 396/3 |
| 2008/0055880 | A1* | 3/2008 | Williams et al. | 362/11 |
| 2008/0166111 | A1* | 7/2008 | Didow et al. | 396/3 |
| 2008/0226273 | A1* | 9/2008 | Kaku | G06T 7/0081 |
| | | | | 396/3 |
| 2008/0240518 | A1 | 10/2008 | Haynes et al. | 382/118 |
| 2009/0042654 | A1 | 2/2009 | Barber | 463/42 |
| 2010/0171848 | A1 | 7/2010 | Peters et al. | 348/239 |
| 2010/0208129 | A1 | 8/2010 | Rindfuss et al. | 348/370 |
| 2010/0296801 | A1* | 11/2010 | Lane | 396/2 |
| 2014/0226032 | A1 | 8/2014 | Tarres Bolos | 348/207.2 |

* cited by examiner ically sized, box-like, kiosk structure with a seat or bench inside and an entrance for receiving one or more users who desire to have their photograph taken. A camera for this purpose is suitably positioned behind a transparent barrier facing the one or more users when in a seated position. Upon depositing payment in a payment receiving receptacle of the structure, the camera is activated concurrently with suitable lighting inside the structure and one or more still photographs of the user(s) are taken automatically. The photographs, usually in strip form, are then printed and dispensed in a tray for the user's ready access. While such conventional arrangements are useful, the photographic options, e.g., use of backgrounds, the quality of photography setting, and associated photo-reproduction has been found limited.

APPARATUS, SYSTEM AND METHOD FOR CAPTURING AND COMPOSITING AN IMAGE USING A LIGHT-EMITTING BACKDROP

This Application is based on U.S. Provisional Patent Application Ser. No. 61/554,899, filed Nov. 2, 2011, the disclosure of which is hereby incorporated by reference herein in its entirety.

FIELD OF THE DISCLOSURE

This disclosure relates generally to image processing and, more particularly, to still photography, motion videography, audiography and the like.

BACKGROUND OF THE DISCLOSURE

Photo booths typically comprise a suitably sized, box-like, kiosk structure with a seat or bench inside and an entrance for receiving one or more users who desire to have their photograph taken. A camera for this purpose is suitably positioned behind a transparent barrier facing the one or more users when in a seated position. Upon depositing payment in a payment receiving receptacle of the structure, the camera is activated concurrently with suitable lighting inside the structure and one or more still photographs of the user(s) are taken automatically. The photographs, usually in strip form, are then printed and dispensed in a tray for the user's ready access. While such conventional arrangements are useful, the photographic options, e.g., use of backgrounds, the quality of photography setting, and associated photo-reproduction has been found limited.

Some photo booths utilize green screen technology as a backdrop for improved photographic reproduction and to enable interaction between the subject and a pre-fabricated background image. While technically effective for photographic reproduction, in general, and integration of a subject or actor with a selected background corresponding to the "green screen", in particular, the resulting composite image and its boundary edge data are characterized by a green hue which detracts from the intended realism of the composite image. Also, in a space-constrained environment of a photo booth, a user's shadow may be cast from the lighting onto the green backdrop, thereby creating undesirable artifacts which also detract from the realism of the composite image.

OBJECTS AND SUMMARY OF THE DISCLOSURE

Accordingly, it is an object of this disclosure to provide an apparatus, a system and a method for photographing an image in a photo booth employing a light-emitting backdrop, which not only provides for use and integration of digital background and foreground images in both still and motion picture photography but also improves the quality of the photographic setting, lighting and associated photo-reproduction.

Another object of the disclosure is to provide an apparatus, system and method for photographing an image in a photo booth employing a light-emitting backdrop that is compact and economical to operate and produce.

A further object of the disclosure is to provide an apparatus, a system and a method for photographing an image in a photo booth employing a light-emitting backdrop, which incorporates audio sound track and/or recording with composite digital images comprising a digital photographic image of one or more subjects as well as background and foreground images in both still and motion picture photography and/or videography.

Still other objects and advantages of the disclosure will become apparent from the following description of the preferred embodiments.

According to one aspect of this disclosure, there is provided a system or apparatus for photographing an image in a photo booth employing a light-emitting backdrop. The apparatus comprises a photo booth including a housing having an entrance on one side with movable closure member for substantially enclosing one or more users or subjects therein so as to minimize encroachment of exterior light. A seat is provided for supporting the one or more subjects to be photographed. Also provided is a first white light source facing the one or more subjects for emitting a first selected light intensity upon the subjects, a second white light emitting source facing generally the rear of the one or more subjects so as to provide a light-emitting photographic backdrop, and a device for receiving a selected form of payment, or alternatively, for activating the apparatus without payment, from the one or more subjects for the one or more photographs to be taken.

In addition, the apparatus includes a photography unit comprising a selected camera, a program-controlled apparatus having random access memory and read-only memory, a printer, and the first light source. The photography unit, upon activation either by receipt of payment-in-full from the one or more subjects or an activation member, takes a digital photograph of objects within the frame of reference against the light-emitting photographic backdrop of the second white light emitting source, data comprising the digital photograph being stored in random access memory of the program-controlled apparatus. The unit further includes a first member and the program-controlled apparatus a first function for selection by the one or more subjects of a desired digital background image for composing with images of one or more subjects of which one or more photographs are to be taken; and a second member and function, respectively, for enabling the one or more subjects to select a frame, the contents of which are to be included in one or more photographs to be taken, defining a plurality of objects to be included in the frame for the one or more photographs to be taken. A member is provided concurrently for adjusting the position of the one or more subjects relative to a center point of the frame of reference.

The program-controlled apparatus includes a third function for applying a first selected algorithm pixel by pixel to the data comprising the digital photograph so as to create a luma mask. The first algorithm performs the steps of determining a threshold brightness value correlated with the second light emitting source, and then for each pixel, determining if its brightness is greater than or equal to the threshold brightness value. If so, it represents the subject and the corresponding pixel on the luma mask is assigned a first binary value of "0", a black color or an opaque appearance, whereas if the pixel brightness is less than the threshold brightness value, then it represents the background image and the corresponding pixel on the luma mask is assigned a second binary value of "1", a white color or a transparent appearance. The resulting luma mask generated pixel by pixel thereby delineates the subject with the color black (or opaque appearance) and the background with the color white (or transparent appearance).

Additionally, a fourth function is provided for composing, using the luma mask, the data comprising the digital photograph of the one or more subjects with data comprising the digital background image, by applying a second selected algorithm pixel by pixel so as to create a digital composite image comprising both the digital photograph and the digital background image. The second algorithm comprises the steps of determining whether the pixel has a first binary value of "0", a black color or an opaque appearance, or a second binary value of "1", a white color or a transparent appearance. If the pixel has the first binary value of "0", black color or opaque appearance, then the corresponding color of the pixel on the composite digital image is replaced with that of the corresponding digital subject image pixel, whereas if the pixel has the second binary value of "1", white color or transparent appearance, then the corresponding color of the pixel on the composite digital image is replaced with that of the corresponding digital background image pixel.

Furthermore, the apparatus has a fifth function for storage of the data comprising the resulting composite digital image of the one or more subjects and background image in random access memory of the program-controlled apparatus and optionally saving the stored data to a hard drive of the program-controlled apparatus. A sixth function is provided as well for showing to the one or more subjects the composite digital image on a display screen of the program-controlled apparatus. 5. Moreover, the apparatus has a seventh function for application of a third selected algorithm pixel by pixel to the data comprising the composite digital image so as to remove visual artifacts and perform edge blending or feathering between edge data comprising the original digital photograph of the one or more subjects, and edge data comprising the original digital background image, which respective edge data borders and is in proximity to one another, so as to produce an enhanced composite digital image. An eighth function is provided for storage of the data comprising the enhanced composite digital image in random access memory of the program-controlled apparatus and optionally saving the stored data to the hard drive. Last, a ninth function is provided for printing one or more photographs of the enhanced composite digital image from the printer.

Alternatively or concurrently, the photography unit includes a first member and the program-controlled apparatus a first function for selection by the one or more subjects of a desired digital background image for composing with images of one or more subjects of which one or more photographs are to be taken; a second member and function, respectively, for enabling the one or more subjects to select a desired digital foreground image, preferably from a database of multiple digital background images, for composing with the images of the one or more subjects and with the selected digital background image; and a third member and function, respectively, for enabling the one or more subjects to select a frame, the contents of which are to be included in one or more photographs to be taken, defining a plurality of objects to be included in the frame for the one or more photographs to be taken.

A fifth function is provided, alternatively or concurrently, for composing, using the luma mask, the data comprising the digital photograph of the one or more subjects with data comprising the digital background image, by applying a second selected algorithm pixel by pixel so as to create a first digital composite image comprising both the digital photograph and the digital background image. In this case, the second algorithm comprises the steps of determining whether the pixel has a first binary value of "0", a black color or an opaque appearance, or a second binary value of "1", a white color or a transparent appearance, and if the pixel has the first binary value of "0", black color or opaque appearance, then the corresponding color of the pixel on the composite digital image is replaced with that of the corresponding digital subject image pixel, whereas if the pixel has the second binary value of "1", white color or transparent appearance, then the corresponding color of the pixel on the first composite digital image is replaced with that of the corresponding digital background image pixel.

Also in such an arrangement, the apparatus includes programming of a seventh function for inputting pre-generated data representing a selected digital foreground mask for visual registration with a selected digital foreground image. Also provided is programming corresponding to an eighth function for composing, using the foreground mask, the data comprising the digital foreground image with data comprising the first digital composite image, by applying a third selected algorithm pixel by pixel so as to create a second digital composite image comprising data of the digital photograph, the digital foreground image, and the digital background image. The third algorithm comprises the steps of determining whether the pixel has a first binary value of "0", a black color or an opaque appearance, or a second binary value of "1", a white color or a transparent appearance. If the pixel has the first binary value of "0", black color or opaque appearance, then the corresponding color of the pixel on the composite digital image is replaced with that of the corresponding digital foreground image pixel, whereas if the pixel has the second binary value of "1", white color or transparent appearance, then the corresponding color of the pixel on the composite digital image is replaced with that of the corresponding first digital composite image pixel.

According to yet another aspect of the disclosure, an apparatus or system is provided for producing a motion picture comprising a plurality of frames, in series, each frame including an image photographed in a photo booth employing a light-emitting backdrop. Concurrently with the foregoing, the apparatus comprises a ninth function for performing the first through eighth functions for each of a selected number of frames per second. A tenth function is also provided for performing the ninth function for each one second time interval comprising the duration of a selected scene. The apparatus includes an eleventh function for storage of the data amassed upon performing the ninth and tenth functions for a selected scene in random access memory and optionally saving the stored data to the hard drive. Programming for a twelfth function is provided for transfer of the data amassed upon performing the eleventh function to a selected device for digital playback. A thirteenth function for printing one or more photographs of any of the enhanced composite digital images of the selected scene from the printer.

In accordance with still another aspect of this disclosure, a method is provided for photographing an image in a photo booth employing a light-emitting backdrop. Initially, one or more users or subjects are located in a photo booth at a selected location for photographing. The photo booth preferably includes a housing with an entrance on one side having a movable closure member such as a black curtain for substantially enclosing the one or more subjects therein so as to minimize encroachment of exterior light, and a seat for supporting the one or more subjects to be photographed. Also provided are a first white light source facing the one or more subjects for emitting a first selected light intensity upon the subjects, and a second white light emitting source facing generally the rear of the one or more subjects so as to provide a light-emitting photographic backdrop.

Next, and optionally, the one or more subjects selects preferably from a database of multiple digital background images a desired digital background image, preferably from a database of multiple digital background images, for composing with images of one or more subjects of which one or more photographs are to be taken. The background image selected is read from the program-controlled apparatus hard drive into random access memory. Using a selected preview window, the contents of which are to be included in one or more photographs to be taken, the one or more subjects define a plurality of objects to be included in the window for the one or more photographs to be taken. The position of the one or more subjects is adjusted relative to a center point of the preview window.

A selected form of payment, for example, a conventional credit card, debit card, arcade coins, arcade debit card, or currency, is then input for the one or more photographs to be taken. Upon receipt of payment-in-full, a photography unit is activated. The unit comprises a selected camera, program-controlled apparatus running a selected operating system and having a microprocessor, random access memory and read-only memory, a printer, and the first light source so as to take a digital photograph of the objects within the frame of reference against the light-emitting photographic backdrop of the second white light emitting source. In the preferred embodiment, the illumination intensity of the second light emitting source is adjusted such the illumination intensity as seen by the camera is greater than the illumination of the first light source reflecting off the subject (s). In other words, the brightness of the backdrop must exceed the brightness of reflected light on the subject(s). This is considered generally necessary to allow the "threshold" algorithm to be performed. Data comprising the digital photograph is stored in the random access memory of the program-controlled apparatus.

A first selected algorithm, for example, is then applied, pixel by pixel, to the data comprising the digital photograph so as to create a luma mask. The algorithm preferably comprises the steps of determining a threshold brightness value correlated with the second light emitting source, and then for each pixel, determining if its brightness is greater than or equal to the threshold brightness value. If the pixel brightness is greater or equal, then it represents the subject and the corresponding pixel on the luma mask is assigned a first binary value of "0", a black color or an opaque appearance, whereas if the pixel brightness is less than the threshold brightness value, then it represents the background image and the corresponding pixel on the luma mask is assigned a second binary value of "1", a white color or a transparent appearance. The resulting luma mask generated pixel by pixel thereby delineates the subject with the color black (or opaque appearance) and the background with the color white (or transparent appearance).

Using the luma mask, the data comprising the digital photograph of the one or more subjects is composed with data comprising the digital background image, by applying, for instance, a second selected algorithm, pixel by pixel, so as to create a digital composite image comprising both the digital photograph of the one or more subjects and the digital background image. In one embodiment, the algorithm comprises the steps of determining whether the pixel has a first binary value of "0", a black color or an opaque appearance, or a second binary value of "1", white color or transparent appearance, and if the pixel has the first binary value of "0", black color or opaque appearance, then the corresponding color of the pixel on the composite digital image is replaced with that of the corresponding digital subject image pixel.

On the other hand, if the pixel has the second binary value of "1", a white color or a transparent appearance, then the corresponding color of the pixel on the composite digital image is replaced with that of the corresponding digital background image pixel. The data comprising the resulting composite digital image of the one or more subjects and background image is stored in random access memory of the program-controlled apparatus and optionally saved to the hard drive. The composite digital image is then shown to the one or more subjects on a display screen of the program-controlled apparatus.

Thereafter, and optionally, a third selected algorithm, for example, is applied, also pixel by pixel, to the data comprising the composite digital image so as to remove visual artifacts and/or perform edge blending or feathering between edge data comprising the original digital photograph of the one or more subjects, and edge data comprising the original digital background image, which respective edge data borders and is in proximity to one another, so as to produce an enhanced composite digital image. The data comprising the enhanced composite digital image is stored in random access memory of the program-controlled apparatus and optionally saved to the hard drive. One or more photographs corresponding to the enhanced composite digital image are then printed from the printer.

Alternatively or concurrently, another method is provided for photographing an image in a photo booth employing a light-emitting backdrop. According to one embodiment, the method comprises the steps of positioning one or more users or subjects in a photo booth at a selected location for photographing. As before, the photo booth preferably includes a housing having an entrance on one side with movable closure member for substantially enclosing the one or more subjects therein so as to minimize encroachment of exterior light, and a seat for supporting the one or more subjects to be photographed. A first white light source faces the one or more subjects for emitting a first selected light intensity upon the subjects, and a second white light emitting source faces generally the rear of the one or more subjects so as to provide a light-emitting photographic backdrop.

Optionally, a desired digital background image is selected, preferably from a database of multiple digital background images, for composing with images of one or more subjects of which one or more photographs are to be taken. The background image selected is read from a hard drive of the program-controlled apparatus into random access memory. In addition, a desired digital foreground image is selected, preferably from a database of multiple digital foreground images, for composing with both the images of the one or more subjects and the selected digital background image. Data corresponding to a digital foreground mask is optionally generated from the digital foreground image preliminarily to the method of the disclosure, as described above, or upon selection of the desired digital foreground, such data being generated, for instance, through application of a first selected algorithm pixel by pixel to the data comprising the digital foreground image and read from the hard drive into random access memory of the program-controlled apparatus. Notably, according to one aspect of the disclosure, a digital background mask is considered unnecessary for the digital background image.

Next, using a selected frame, the contents of which are to be included in one or more photographs to be taken, a plurality of objects to be included in the frame for the one or more photographs to be taken are defined. The position of the one or more subjects is adjusted relative to a center point of the frame of reference.

A selected form of payment is then input for the one or more photographs to be taken. Upon receipt of payment-in-full, a photography unit is activated. Again, the unit comprises a selected camera, program-controlled apparatus having random access memory and read-only memory, a printer, and light source so as to take a digital photograph of the objects within the frame of reference against the light-emitting photographic backdrop of the second white light emitting source. Data comprising the digital photograph is stored in the random access memory of the program-controlled apparatus.

A second selected algorithm, for example, is applied, pixel by pixel, to the data comprising the digital photograph so as to create a luma mask. The second algorithm preferably comprises the steps of determining a threshold brightness value correlated with the second light emitting source, and then for each pixel, determining if its brightness is greater than or equal to the threshold brightness value. The threshold brightness value is preferably correlated with the background light intensity, which in the present embodiment is selected to be the brightest part of the image. If the pixel brightness is greater or equal, then it represents the subject and the corresponding pixel on the luma mask is assigned a first binary value of "0", a black color, or an opaque appearance. If, on the other hand, the pixel brightness is less than the threshold brightness value, then it represents the background image and the corresponding pixel on the luma mask is assigned a second binary value of "1", a white color, or a transparent appearance. The resulting luma mask generated pixel by pixel thereby delineates the subject with the color black (or opaque appearance) and the background with the color white (or transparent appearance).

Using the luma mask, the data comprising the digital photograph of the one or more subjects is composed with data comprising the digital background image, by applying, for instance, a third selected algorithm pixel by pixel so as to create a first digital composite image comprising both the digital photograph and the digital background image. It is preferred that the algorithm comprise the steps of determining whether the pixel has a first binary value of "0", a black color or an opaque appearance, or a second binary value of "1", a white color or a transparent appearance. If the pixel has the first binary value of "0", a black color or an opaque appearance, then the corresponding color of the pixel on the first composite digital image is replaced with that of the corresponding digital subject image pixel. Whereas, if the pixel has the second binary value of "1", a white color or a transparent appearance, then the corresponding color of the pixel on the first composite digital image is replaced with that of the corresponding digital background image pixel. The data comprising the first composite digital image of the one or more subjects and background image is then stored in random access memory of the program-controlled apparatus and optionally saved to the hard drive.

Using the foreground mask, the data comprising the digital foreground image is composed with data comprising the first digital composite image, by applying a fourth selected algorithm pixel by pixel so as to create a second digital composite image comprising data of the digital photograph, the digital foreground image, and the digital background image. The fourth algorithm comprises the steps of determining whether the pixel has a first binary value of "0", a black color or an opaque appearance, or a second binary value of "1", white color or transparent appearance. If the pixel has the first binary value of "0", black color or opaque appearance, then the corresponding color of the pixel on the composite digital image is replaced with that of the corresponding digital foreground image pixel. However, if the pixel has the second binary value of "1", a white color or a transparent appearance, then the corresponding color of the pixel on the composite digital image is replaced with that of the corresponding first digital composite image pixel. The resulting composite digital image is then shown to the one or more subjects on a display screen of the program-controlled apparatus.

Thereafter, and optionally, a fifth selected algorithm is applied, pixel by pixel, to the data comprising the composite digital image so as to remove visual artifacts and perform edge blending or feathering between edge data comprising the original digital photograph of the one or more subjects, and edge data comprising the original digital background image, which respective edge data borders and is in proximity to one another, so as to produce an enhanced composite digital image. The data comprising the enhanced composite digital image is stored in random access memory of the program-controlled apparatus and optionally saved to the hard drive. One or more photographs corresponding to the enhanced composite digital image are then printed from the printer.

BRIEF DESCRIPTION OF THE DRAWINGS

The same numerals are used throughout the figure drawings to designate similar elements. Still other objects and advantages of the disclosure will become apparent from the following description of the preferred embodiments.

DETAILED DESCRIPTION OF THE DISCLOSURE

Figure 1:
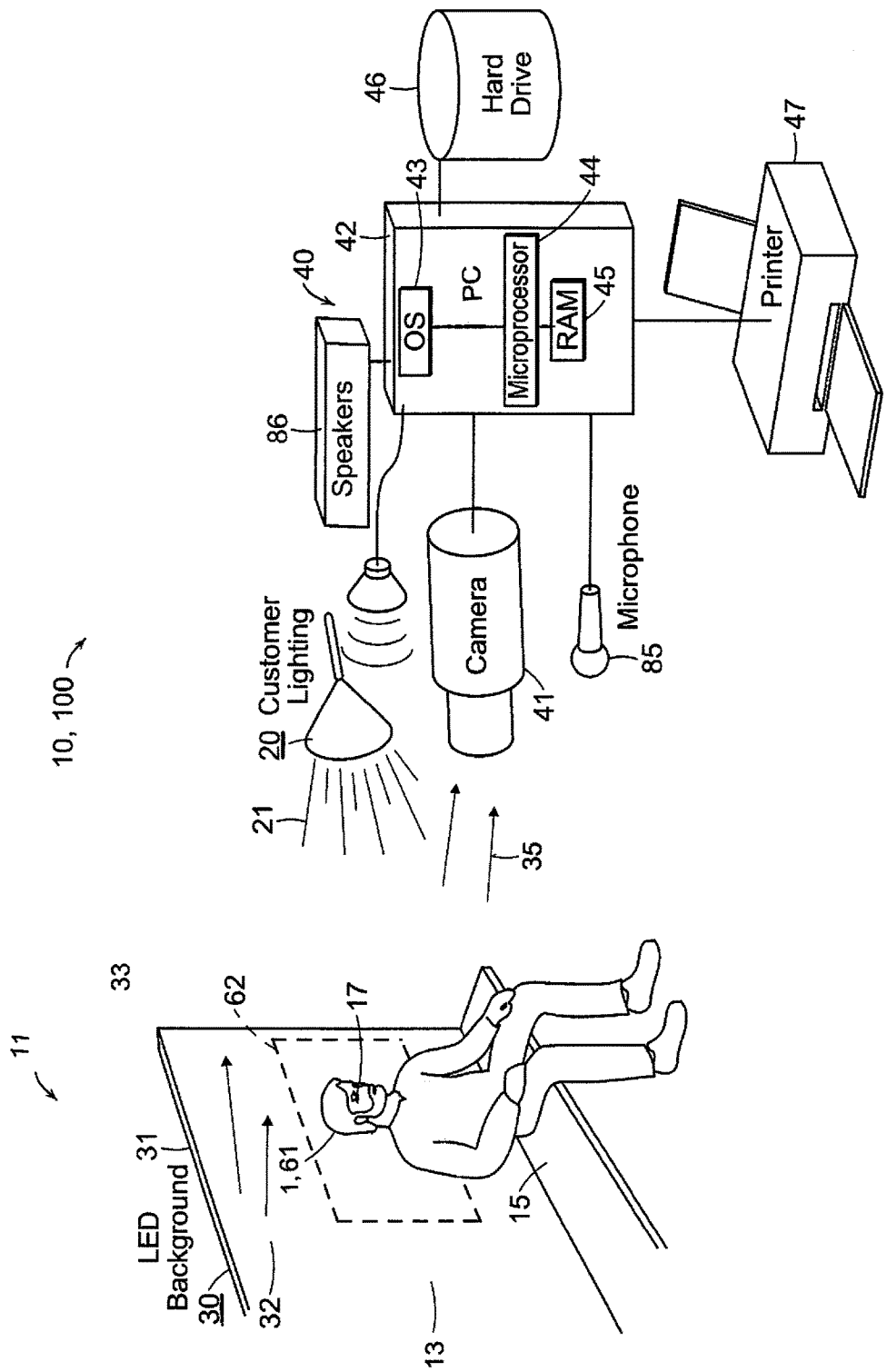
FIGS. 1 and 1A illustrate schematically an apparatus for photographing an image in a photo booth employing a light-emitting backdrop, according to one aspect of the disclosure.
Figure 1A:
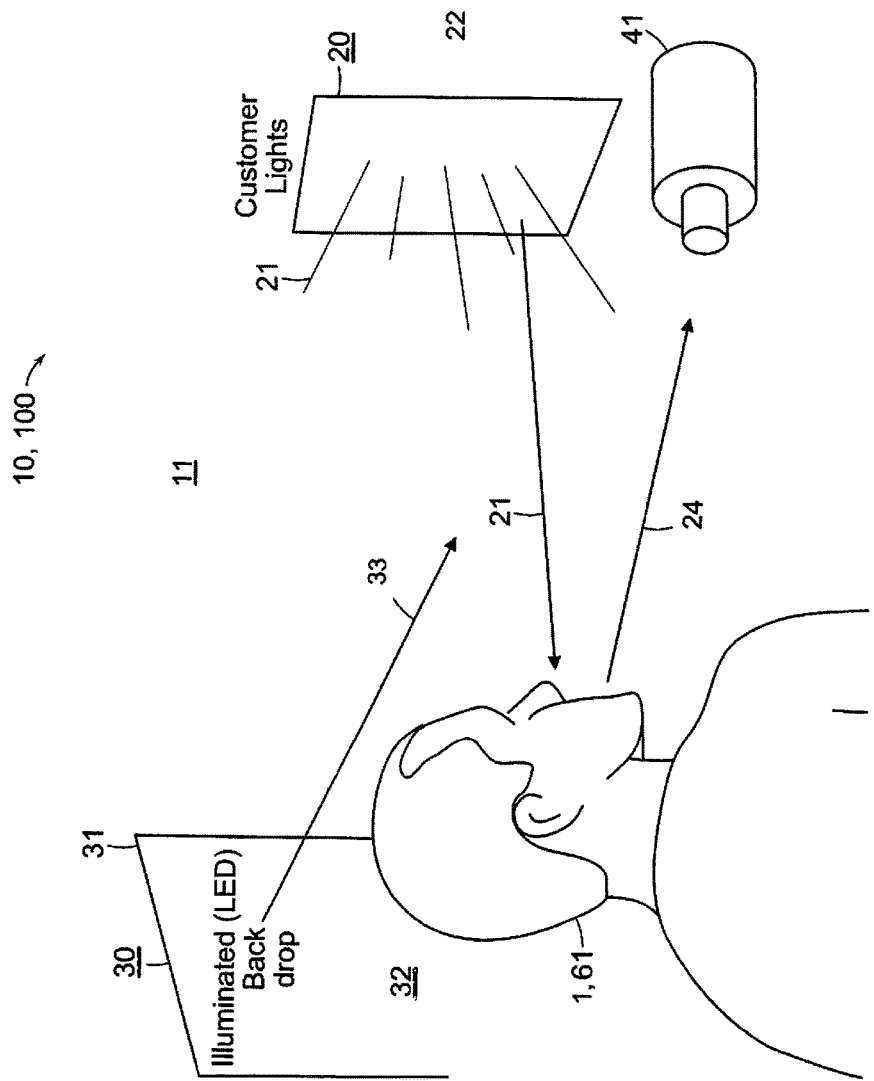
Figure 2:
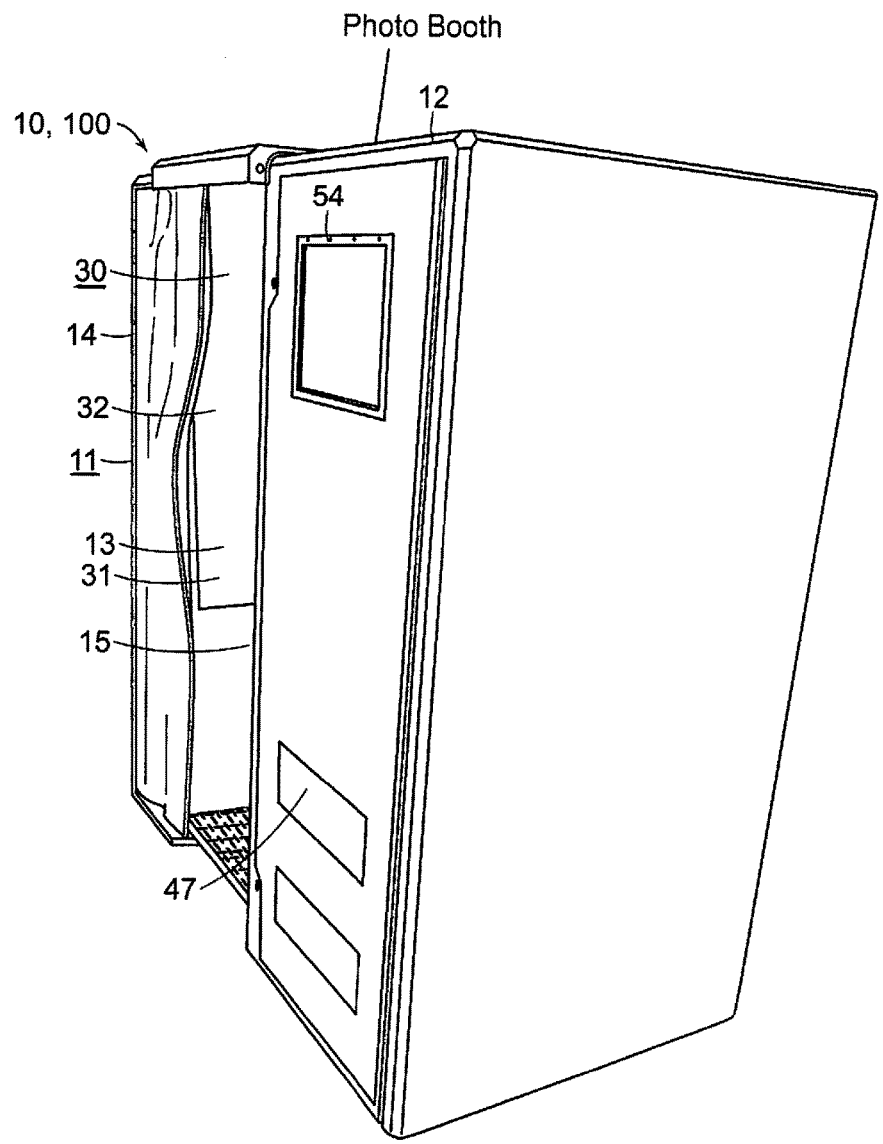
FIG. 2 is a perspective view of a photo booth, according to another aspect of the disclosure.

Referring now to the drawings and, more particularly, to FIGS. 1-21, there is shown generally a specific, illustrative apparatus, system and method for photographing an image in a photo booth employing a light-emitting backdrop, according to various aspects of the disclosure. For example, as shown in FIGS. 1, 1A and 2, system or apparatus 10 comprises a photo booth 11 which includes a housing 12, e.g., box-like, having an entrance 13 on one side with movable closure 14, for instance, a black curtain, for substantially enclosing one or more users or subjects 1 therein so as to minimize encroachment of exterior light. The photo booth also has a seat 15 for supporting the one or more subjects to be photographed, a first white light source 20 facing the one or more subjects for emitting a first selected light intensity 21 upon the subjects, and a second white light emitting source 30 facing generally the rear of the one or more subjects so as to provide a light-emitting photographic backdrop 31.

Figure 3:
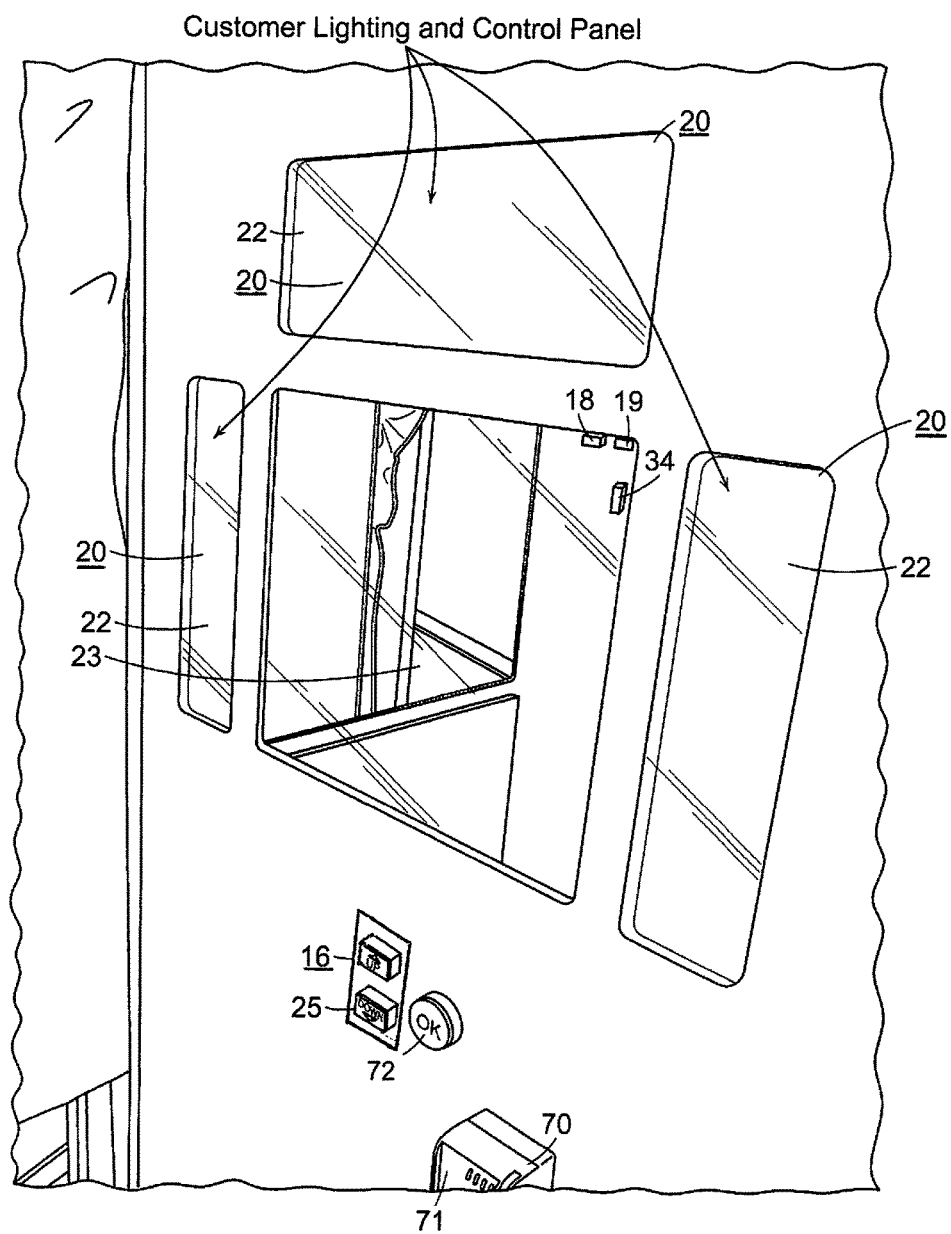
FIG. 3 is a perspective view of first interior portions of the photo booth of FIG. 2 including a first light source, camera window, adjustment member, activation members, and payment receiving device.
Figure 4:
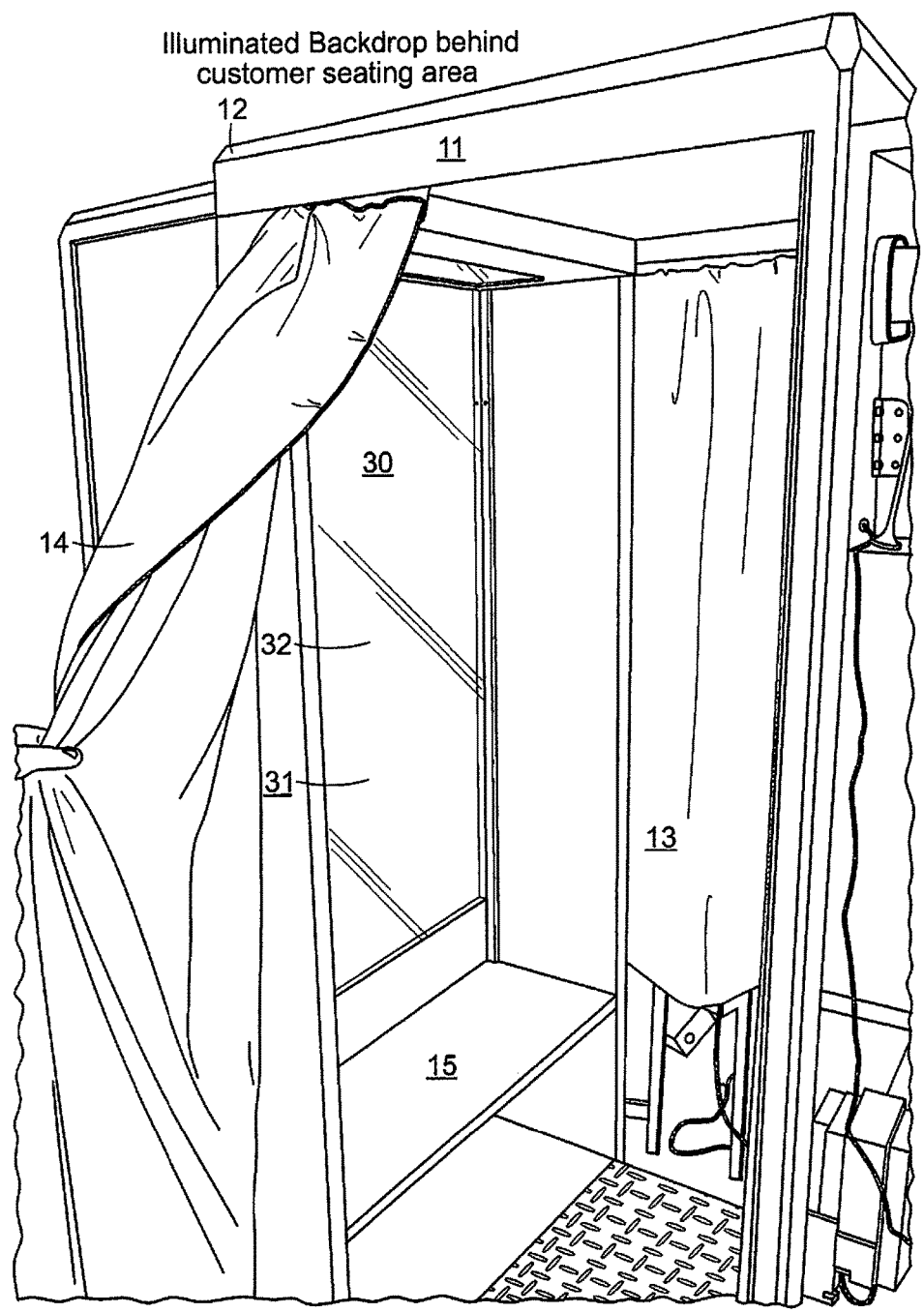
FIG. 4 is a perspective view of second interior portions of the photo booth of FIG. 2 including a seat and a second light source with light-emitting backdrop.

Preferably, as illustrated in FIG. 3, first light source 20 comprises, for instance, a plurality of relatively flat fluorescent, incandescent or LED light panels 22 arranged around a camera window 23. Suitable second light sources 30 include, but are not limited to, an LED embedded, translucent panel 32 constructed, for example, of plexiglass, acrylic or polycarbonate, such as one produced by Fawoo Technology Co., Ltd. or like relatively thin backdrop structure. An arrangement of this general description is best seen in FIG. 4. Such arrangements are considered particularly desirable for maintaining uniformity of light, minimizing energy use and space requirements, and providing a relatively safe operating voltage generally less than or equal to 12 volts. In general, the type and nature of the lighting used is optimized for photographic purposes, as will be understood by those skilled in the art, with an eye toward luma-key technology.

Figure 5:
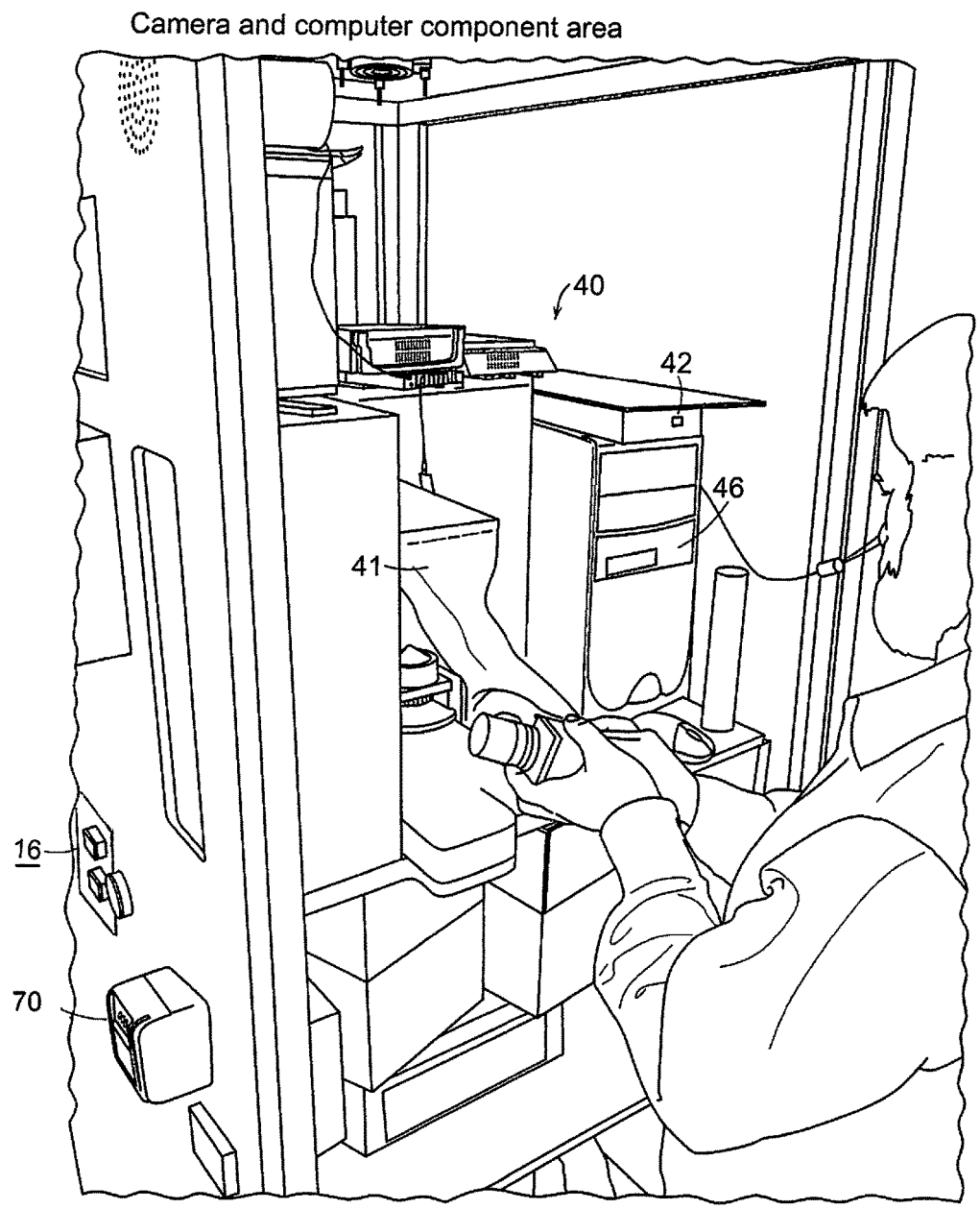
FIG. 5 is a perspective view of a photography unit, according to another aspect of the disclosure.

As shown in FIGS. 1 and 5, the apparatus also includes a photography unit 40 which comprises a selected camera 41, such as an IEEE 1394 DCAM from "The Imagining Source" or Allied Vision Technologies, or like camera arrangement.

The photography unit also has a program-controlled apparatus 42 (See FIGS. 1, 5 and 6) such as a conventional high performance personal computer running a selected operating system 43, e.g., Linux, and having a microprocessor 44, preferably a high performance chip, e.g., an Intel Core 2 CPU, random access memory 45 and read-only memory 46, for instance, a solid state, high performance hard drive such as an Intel Solid State Drive. As shown in FIG. 1, the unit additionally provides a printer 47, e.g., a conventional, off-the-shelf type photographic computer printer such as a DNP DS40, and preferably houses first light source 20 for taking a digital photograph 60, as shown in FIG. 7, of objects 61 (or subjects 1) within a frame of reference 62 against light-emitting photographic backdrop 31 of second white light emitting source 30.

In a preferred embodiment, illumination intensity 33 of the second light emitting source is adjusted using a variable voltage supply or a rheostat 34 (see FIG. 3) such that the illumination intensity 35 as seen by the camera is greater than the illumination intensity 24 of the first light source reflecting off the subject(s). In other words, the brightness of the backdrop must exceed the brightness of reflected light on the subject(s). This is considered generally necessary to allow the "threshold" algorithm to be performed, as described in detail below. Data 63 comprising the digital photograph is stored in random access memory 45 of program-controlled apparatus 42.

The photography unit, when activated such as upon receipt of payment-in-full from the one or more subjects, takes the digital photograph of objects within the frame of reference against the light-emitting photographic backdrop of the second white light emitting source. The data comprising the digital photograph is stored in the random access memory of the program-controlled apparatus. As best seen in FIG. 3, a member 16, for example, a multi-directional knob, is preferably included for adjusting the position of the one or more subjects relative to a center point 17 (See FIG. 1) of frame of reference 62.

Preferably, a device 70 is provided for receiving a selected form of payment, for example, a conventional credit card, debit card, arcade coins, arcade debit card, or currency, from the one or more subjects for the one or more photographs to be taken. Upon receipt of payment-in-full, the photography unit is activated. According to one arrangement, the payment receiving device is of a conventional, electronically operated, coin deposit and/or paper currency scan receiving type. Alternatively or concurrently, a conventional credit card scanner 71 with keyboard type payment receiver is provided for accepting payment. Further in the alternative or concurrently therewith, an activation member 72 (e.g., button, switch, lever or the like) is provided which, when pressed by one or more subjects, activates—separately from the payment receiving device—the photography unit to take the digital photograph.

Such an activation member has been found advantageous, for instance, when the apparatus is to be operated in "free mode" (e.g., when one, two or all of the aforementioned arrangements are deactivated) as for use by one or more subjects at charitable events, weddings, promotions, and the like. The activation member is also useful in the event of malfunction of one, two or all of the aforementioned arrangements for receiving payment. According to yet another arrangement, the activation member is provided optionally to serve as an override of one, two or all of the aforementioned arrangements for receiving payment.

Figure 6:
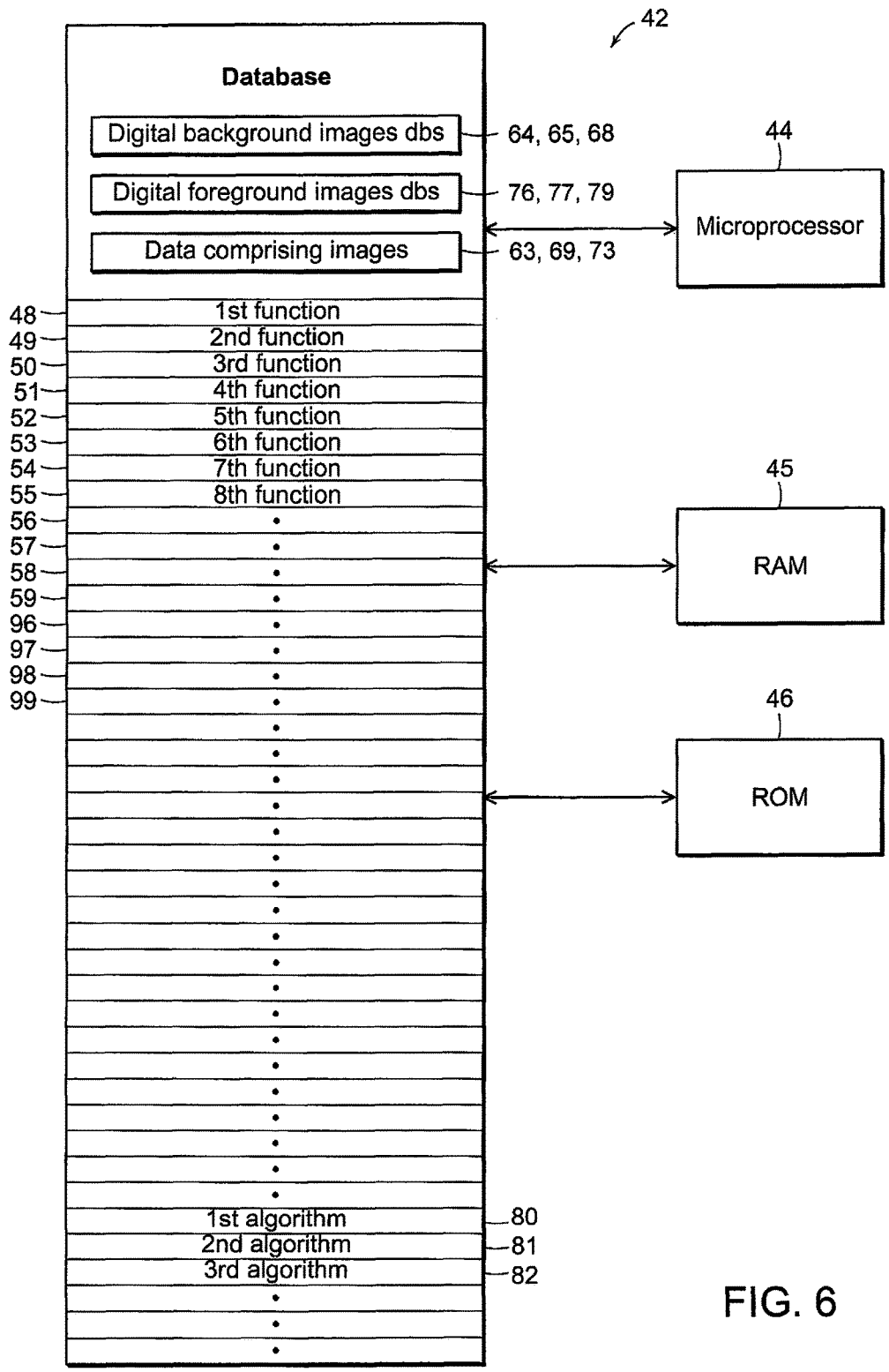
FIG. 6 illustrates schematically a program controlled apparatus and database, according to a further aspect of the disclosure.
Figure 8:
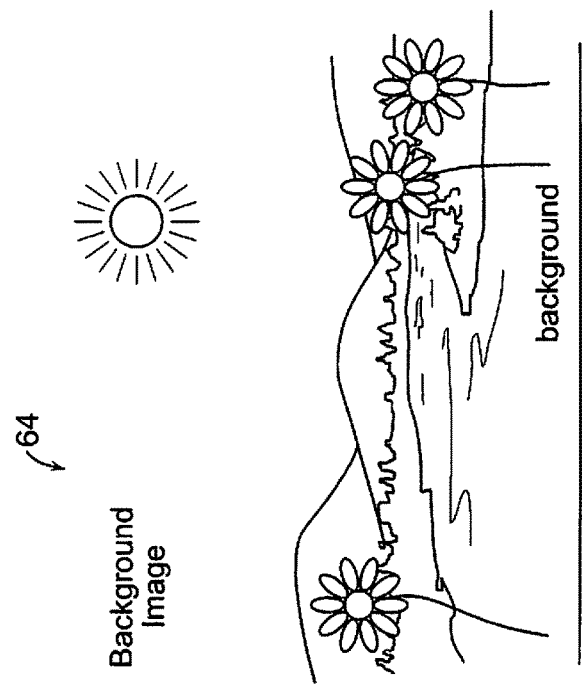
FIG. 8 is plan view of a digital background image, according to one aspect of the disclosure.
Figure 7:
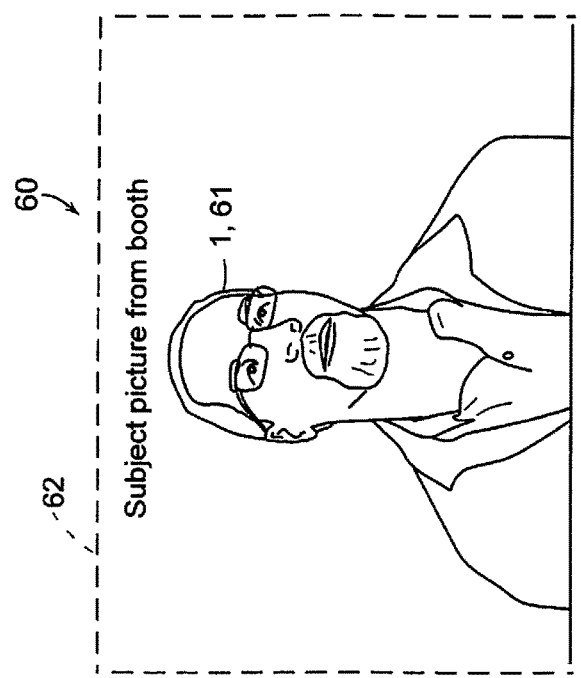
FIG. 7 is a plan view of a digital photograph of a subject, according to one aspect of the disclosure.

Turning now to FIGS. 3, 6 and 8, the photography unit includes, in addition, a first member 18, e.g., an activation button, switch, lever or the like, and the program-controlled apparatus a first function 48 for selection by the one or more subjects of a desired digital background image 64, preferably from a database 65 of multiple digital background images, for composing with images of one or more subjects of which one or more photographs are to be taken. The program-controlled apparatus preferably includes the database of multiple digital background images to facilitate the selection process. The background image selected is read from the program-controlled apparatus hard drive into random access memory. According to one example, button 18 is pressed by the subject(s), thereby activating the first function of the program-controlled apparatus for selection of the digital background image.

A second member 19, e.g., also an activation button, switch, lever or the like, is provided for activating a second program-controlled apparatus function 49 and, thereby, enabling the one or more subjects to select the frame of reference 62, the contents of which are to be included in one or more photographs to be taken, and defining a plurality of objects to be included in the frame for the one or more photographs to be taken. For example, using a selected preview window, the contents of which are to be included in one or more photographs to be taken, the one or more subjects define, e.g., using a camera height/centering control such as "UP" and "DOWN" buttons 25, a plurality of objects to be included in the window for the one or more photographs to be taken.

Although reference is made in this disclosure to first and second members, those skilled in the art will appreciate that such members (and exemplary first and second activation buttons, switches, levers or the like) may be separate or may refer to a common member (e.g., the same button, switch, lever) or like structure for activation of the first and second functions.

Figure 9:
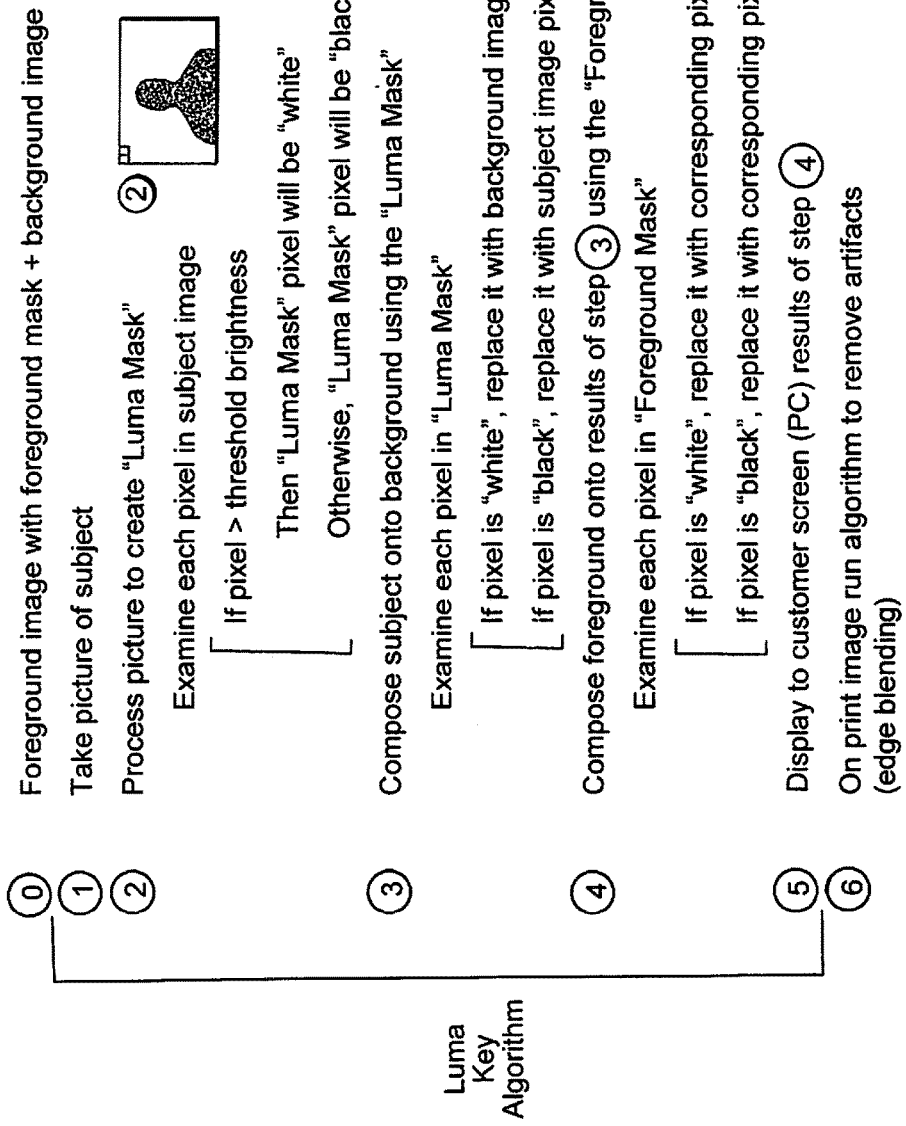
FIG. 9 illustrates operation of the apparatus set forth in FIG. 1, according to various aspects of the disclosure.

The program-controlled apparatus also includes a third function 50 for applying a first selected algorithm 80 pixel by pixel to the data comprising the digital photograph so as to create a luma mask 66. Preferably, as illustrated in FIG. 9, the first algorithm performs the following steps. First, a threshold brightness value 36 correlated with second light emitting source 30 is determined. Then, for each pixel, it is determined whether its brightness is greater than or equal to the threshold brightness value, and, if so, it represents the subject and the corresponding pixel on luma mask 66 is assigned a first binary value of "0", a black color or an opaque appearance. If, on the other hand, the pixel brightness is less than the threshold brightness value, then it represents the background image and the corresponding pixel on the luma mask is assigned a second binary value of "1", a white color or a transparent appearance. As set forth in FIG. 9, the resulting luma mask generated pixel by pixel thereby delineates subject 1 with the color black (or opaque appearance) and the background 67 with the color white (or transparent appearance).

Figure 15:
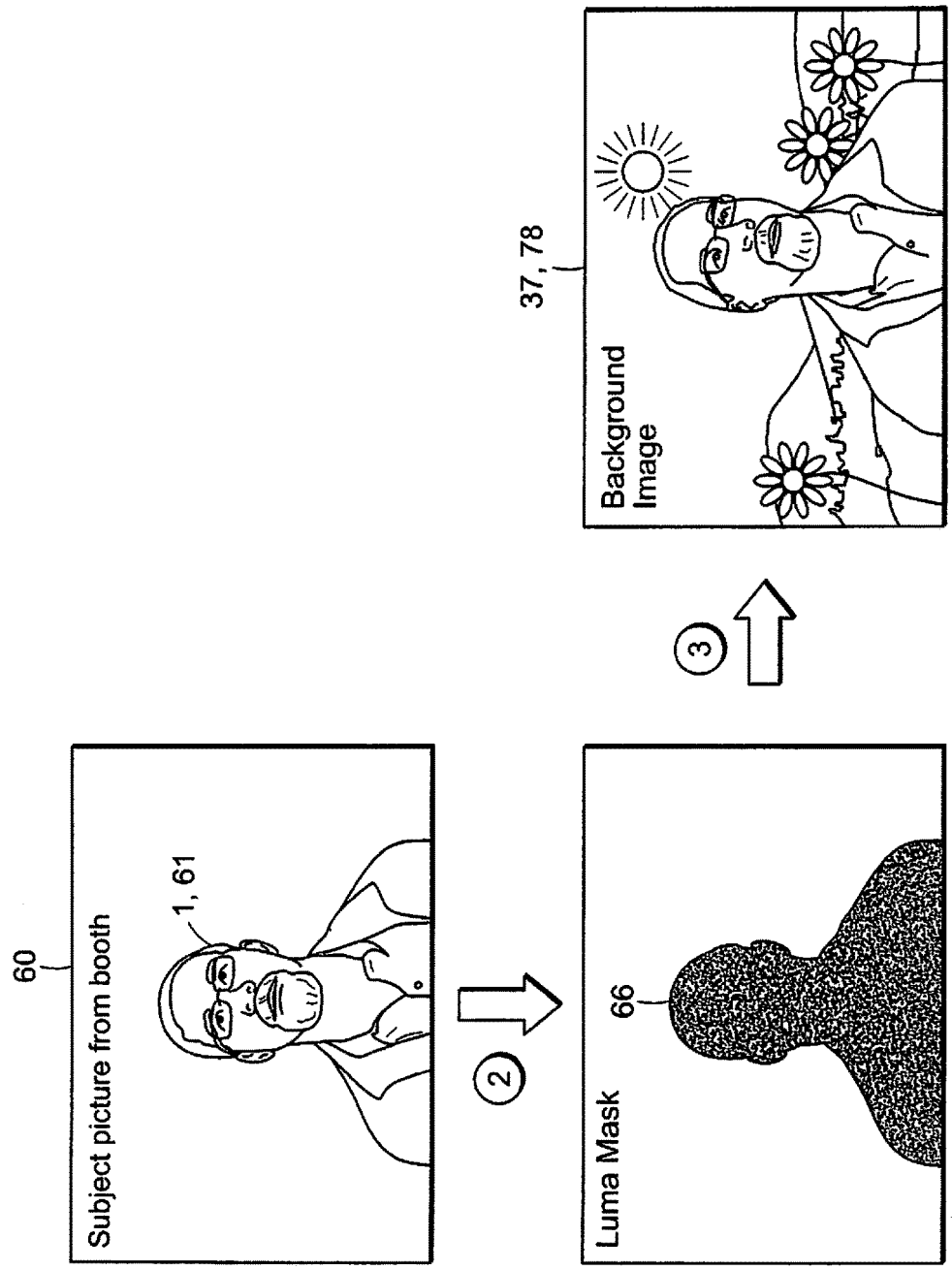
FIG. 15 is a flow diagram showing a sequence of composing data comprising the digital photograph of the subject and the luma mask with data comprising a background image into a first digital composite image.
Figure 16:
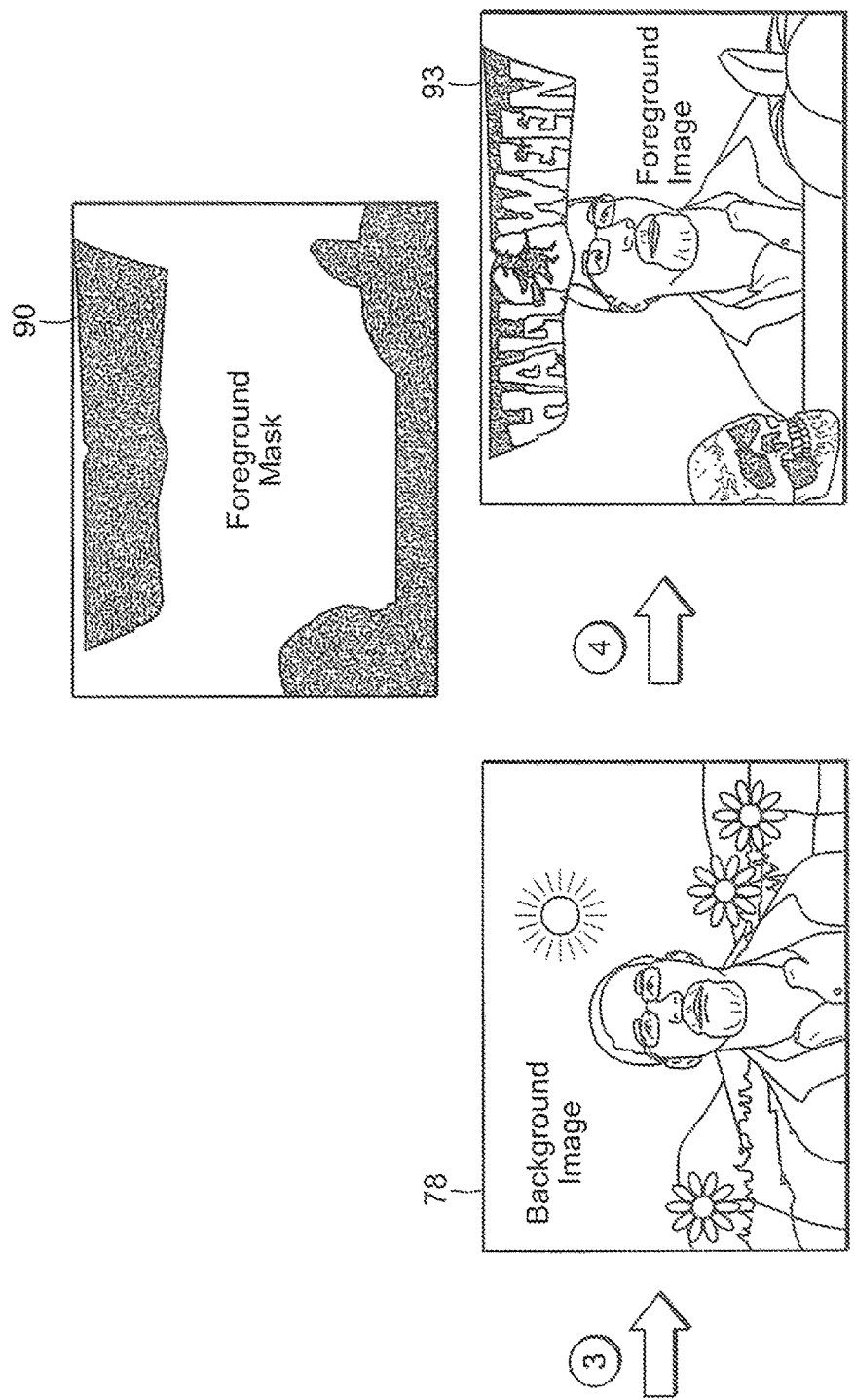
FIG. 16 is a flow diagram showing a sequence of composing data comprising the first digital composite image of FIG. 15 with data comprising a digital foreground mask into a second digital composite image, in accordance with one aspect of the disclosure.

Additionally, the program-controlled apparatus has a fourth function 51 for composing, using the luma mask, data 63 comprising the digital photograph of the one or more subjects with data 68 comprising digital background image 64. More specifically, a second selected algorithm 81 is applied, pixel by pixel, so as to create a digital composite image 37, as best seen in FIG. 15, comprising both the digital photograph and the digital background image. The second algorithm comprises the steps of determining whether the pixel has a first binary value of "0", a black color or an opaque appearance, or a second binary value of "1", a white color or a transparent appearance. If the pixel has the first binary value of "0", black color or opaque appearance, then the corresponding color of the pixel on the composite digital image is replaced with that of the corresponding digital subject image pixel. On the other hand, if the pixel has the second binary value of "1", white color or transparent appearance, then the corresponding color of the pixel on the composite digital image is replaced with that of the corresponding digital background image pixel.

The program-controlled apparatus is further provided with a fifth function 52 for effecting storage of data 69 comprising the resulting composite digital image of the one or more subjects and background image in the random access memory of the program-controlled apparatus. Alternatively or concurrently therewith, the fifth function provides for storage of the data to the hard drive of the program-controlled apparatus. A sixth function 53 is provided as well for effecting display to the one or more subjects of the composite digital image on a display screen 54 (See FIG. 2) of the program-controlled apparatus.

Further in the alternative or concurrently therewith, the program-controlled apparatus is provided with a seventh function 55 for data processing and production of an enhanced composite digital image 73. The seventh function preferably includes a third selected algorithm 82 which is applied pixel by pixel to data 69 comprising the composite digital image so as to remove visual artifacts and perform edge blending or feathering between edge data comprising the original digital photograph of the one or more subjects, and edge data comprising the original digital background image, which respective edge data borders and is in proximity to one another. Upon completion of the third algorithm, enhanced composite digital image 73 is produced. Conventional software with routines for performing edge feathering according to the third algorithm include, for instance, Image Magick. Operations performed by such software include blurring of adjacent edges and transitions and/or creation of semi-transparent transitions from the background image to the subject.

An eighth function 56 of the program-controlled apparatus provides for storage of the data comprising the enhanced composite digital image in random access memory of the program-controlled apparatus. Alternatively or concurrently, the eighth function provides for storage of the data to the program-controlled apparatus hard drive. The sixth function effects display to the one or more subjects of the enhanced composite digital image on display screen 54 of the program-controlled apparatus. Finally, a ninth function 57 of the program-controlled apparatus then effects printing of one or more photographs 75 of enhanced composite digital image 73 from printer 47.

Generally speaking, higher resolution photographs are preferred. According to one arrangement, a resolution of 1024×768 is used for optimum quality and performance. In another embodiment, for lesser processing requirements, a resolution of 800×600 is utilized. As those skilled in the art will appreciate, resolutions are selected given consideration to the computer processing power available. Moreover, conventional computer code optimization methods are utilized for added efficiency and speed of operations, as will be understood by those skilled in the art.

In general, by use of white light-emitting backdrop 31, brightness and whiteness are deemed to be relatively significant to the quality and effectiveness of the composite image produced. Although other colors could be used, white is considered advantageous as being relatively less detrimental to the image, for instance, because of the aesthetics of the resulting halo/reflection around the subject edges.

In accordance with another arrangement for photographing an image in a photo booth employing light-emitting backdrop, an apparatus is provided as described above but with added photography unit features and computer based functions. In the present embodiment, the photography unit again includes first member 18, e.g., an activation button, switch, lever or the like, and the program-controlled apparatus first function 48 for selection by the one or more subjects of desired digital background image 64 for composing with images of one or more subjects of which one or more digital photographs 60 are to be taken. The program-controlled apparatus preferably includes database 65 of multiple digital background images to facilitate the selection process. The background image selected is read from read-only memory 46, e.g., a hard drive, of program-controlled apparatus 42 into random access memory 45.

Figure 11:
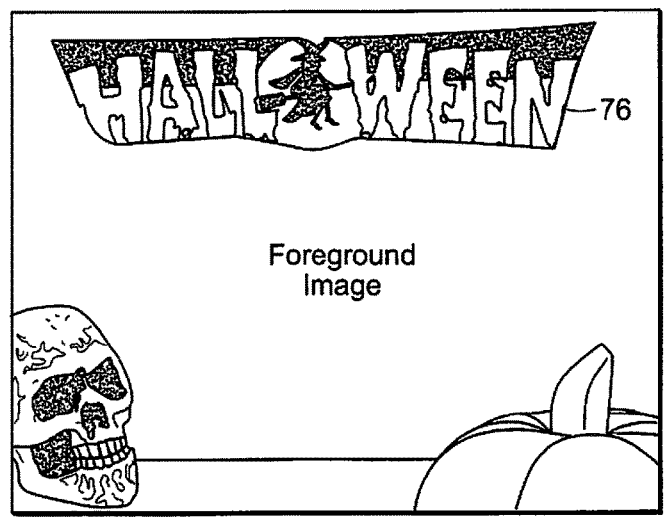
FIG. 11 is a plan view of a foreground image for composing with the digital photograph shown in FIG. 7.

The unit also has a third member 26, e.g., an activation button, switch, lever or the like, and the program-controlled apparatus a tenth function for enabling the one or more subjects to select a desired digital foreground image 76, illustrated in FIG. 11, preferably from a database 77 of multiple digital foreground images, for composing with the images of the one or more subjects and with selected digital background image 64. In addition, the unit is provided with second member 19, e.g., an activation button, switch, lever or the like, and the program-controlled apparatus with second function 49 for enabling the one or more subjects to select frame of reference 62. The contents of the frame are to be included in one or more photographs to be taken, and thus defining a plurality of objects to be included in the one or more photographs to be taken.

As will be appreciated by those skilled in the art, the first, second and third members (and exemplary first, second and third activation buttons, switches, levers or the like) may be separate or may refer to a common member (e.g., a single button, switch, lever) or like structure, or two members, one of which shares multiple functions, for activation of the first, second and third functions.

Figure 10:
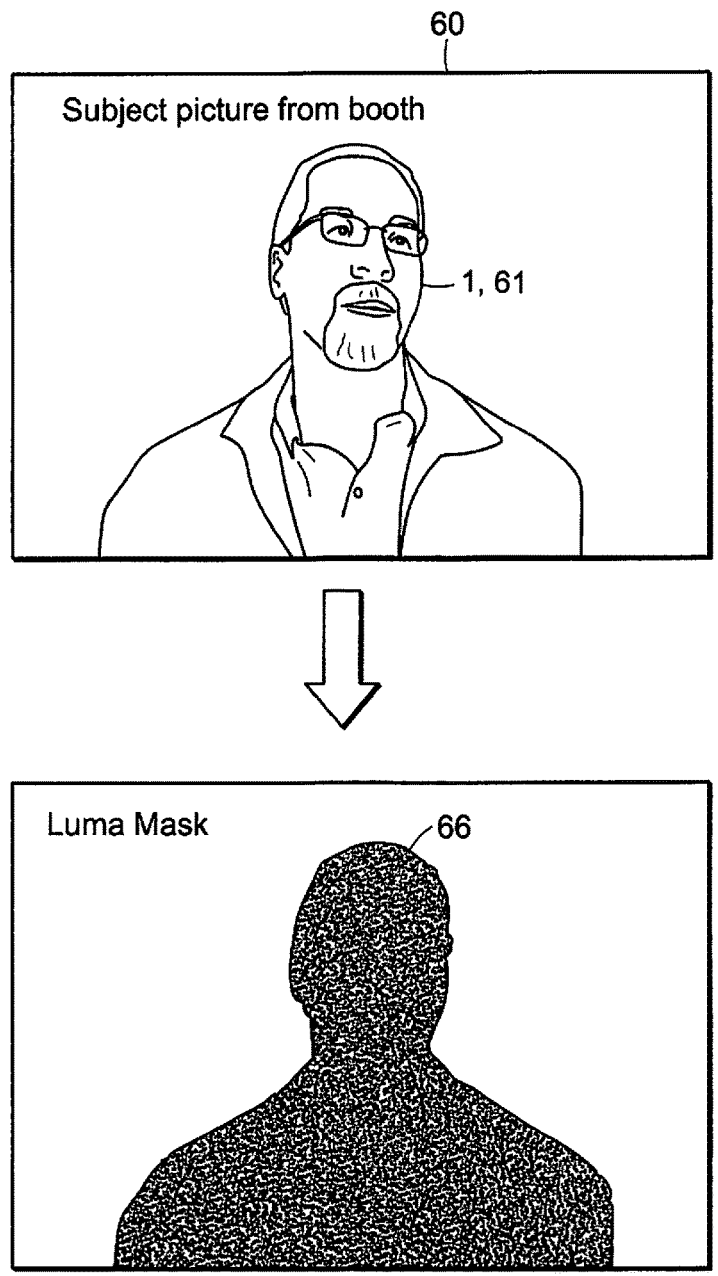
FIG. 10 is a plan view of a luma mask generated from the digital photograph shown in FIG. 7.

According to this example, the program-controlled apparatus includes fourth function 51 for applying first selected algorithm 80 pixel by pixel to the data comprising the digital photograph so as to create the luma mask, illustrated in FIG. 10. In particular, the first algorithm performs the following steps: First, it determines the threshold brightness value correlated with the second light emitting source, and for each pixel, determines if its brightness is greater than or equal to the threshold brightness value. If so, then it represents the subject and the corresponding pixel on the luma mask is assigned a first binary value of "0", a black color or an opaque appearance. However, if the pixel brightness is less than the threshold brightness value, then it represents the background image and the corresponding pixel on the luma mask is assigned a second binary value of "1", a white color or a transparent appearance. The resulting luma mask generated pixel by pixel thereby delineates the subject with the color black (or opaque appearance) and the background with the color white (or transparent appearance).

Furthermore, the program-controlled apparatus has fifth function 52 for composing, using the luma mask, data 63 comprising the digital photograph of the one or more subjects with data 68 comprising the digital background image. More specifically, second selected algorithm 81 is applied, pixel by pixel, so as to create a first digital composite image 78 comprising both digital photograph 60 and digital background image 64. The second algorithm comprises the steps of determining whether the pixel has a first binary value of "0", a black color or an opaque appearance, or a second binary value of "1", a white color or a transparent appearance. If the pixel has the first binary value of "0", black color or opaque appearance, then the corresponding color of the pixel on the composite digital image is replaced with that of the corresponding digital subject image pixel. Whereas, if the pixel has the second binary value of "1", white color or transparent appearance, then the corresponding color of the pixel on the first composite digital image is replaced with that of the corresponding digital background image pixel.

The program-controlled apparatus is further includes sixth function 53 as well for effecting storage of the data comprising the resulting first composite digital image of the one or more subjects and background image in random access memory of the program-controlled apparatus. Alternatively or concurrently therewith, seventh function 55 provides for storage of the data to read-only memory 46, e.g., a hard drive, of the program-controlled apparatus.

Figure 12:
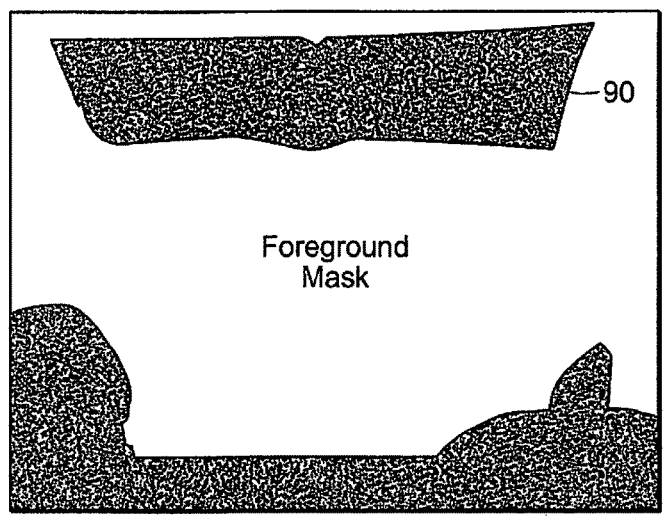
FIG. 12 is a plan view of a foreground mask generated from the foreground image illustrated in FIG. 11.

Moreover, the program-controlled apparatus is provided with eighth function 56 for inputting pre-generated or pre-supplied data 79, e.g., artwork, representing a selected digital foreground mask 90 (See FIG. 12). Again, the program-controlled apparatus preferably includes database 77 of multiple digital foreground images to facilitate the selection process by the one or more subjects. Once the foreground image is selected, the system will read in or input corresponding pre-supplied foreground mask 90 for digital foreground image 76. Generally speaking, data 92 comprising the digital foreground mask and data 91 comprising the digital foreground image are read in or input from read-only memory 46, e.g., a hard drive, of the program-controlled apparatus into random access memory 45. Such pre-generated data 79 is selected due to its suitability for visual registration with a selected digital foreground image.

Stated differently, the digital foreground mask is a mapping held in visual registration with the digital foreground image, and the data of the digital foreground mask instructs the algorithm how to combine the foreground digital image with the composed subject layer. The foreground image is a complete image—a full and unbroken rectangle of pixels of content. The purpose of the foreground mask is to selectively instruct the algorithm where to obscure the subject layer with the foreground pixels and where to reveal the subject layer (ignoring the pixels of the foreground layer).

Figure 13:
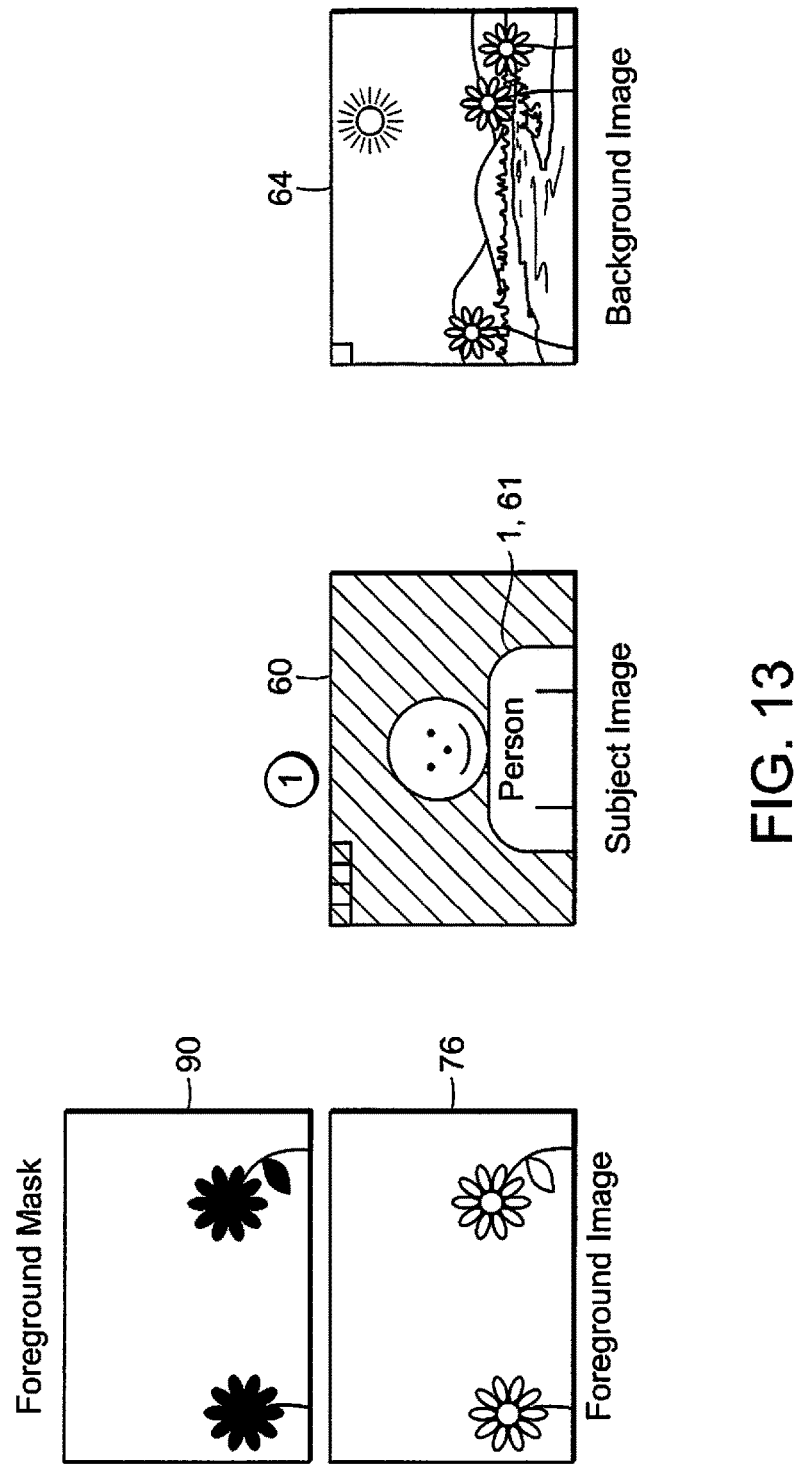
FIG. 13 illustrates schematically an operation of selecting a digital photograph of a subject, background image, foreground image and generation of a foreground mask, according to one aspect of the disclosure.

As shown in FIG. 13, additionally included with programming of program-controlled apparatus 42 is ninth function 57 for composing, using foreground mask 90, data 91 comprising the digital foreground image with data 38 comprising the first digital composite image 78. This is accomplished desirably by applying third selected algorithm 82 pixel by pixel so as to create a second digital composite image 93 comprising data 63 of the digital photograph, data 91 of the digital foreground image, and data 68 of the digital background image. According to one arrangement, illustrated in FIG. 9, the third algorithm comprises the steps of determining whether the pixel has a first binary value of "0", a black color or an opaque appearance, or a second binary value of "1", a white color or a transparent appearance. If the pixel has the first binary value of "0", black color or opaque appearance, then the corresponding color of the pixel on the composite digital image is replaced with that of the corresponding digital foreground image pixel. If, on the other hand, the pixel has the second binary value of "1", white color or transparent appearance, then the corresponding color of the pixel on the composite digital image is replaced with that of the corresponding first digital composite image pixel. A tenth function 58 is provided as well for effecting display to the one or more subjects of the composite digital image on display screen 54 of program-controlled apparatus 42.

Further in the alternative or concurrently therewith, the program-controlled apparatus is provided with an eleventh function 59 for data processing and production of an enhanced composite digital image 94. The eleventh function desirably includes a fourth selected algorithm 83 which is applied pixel by pixel to the data 95 comprising the composite digital image so as to remove visual artifacts and perform edge blending or feathering between edge data comprising the original digital photograph of the one or more subjects, and edge data comprising the original digital background image, which respective edge data borders and is in proximity to one another. Upon completion of the fourth algorithm, enhanced composite digital image 94 is produced.

Figure 17:
FIGS. 17-19 illustrate exemplary enhanced composite digital images comprising data of selected digital photographs, digital foreground images, and digital background images, according to another aspect of the disclosure.
Figure 18:
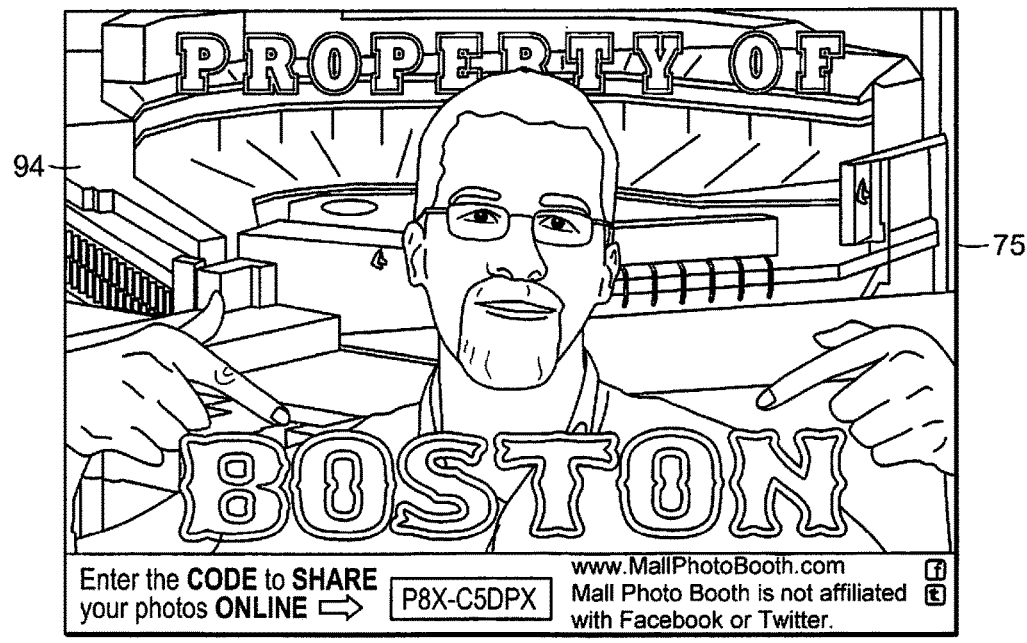
Figure 19:
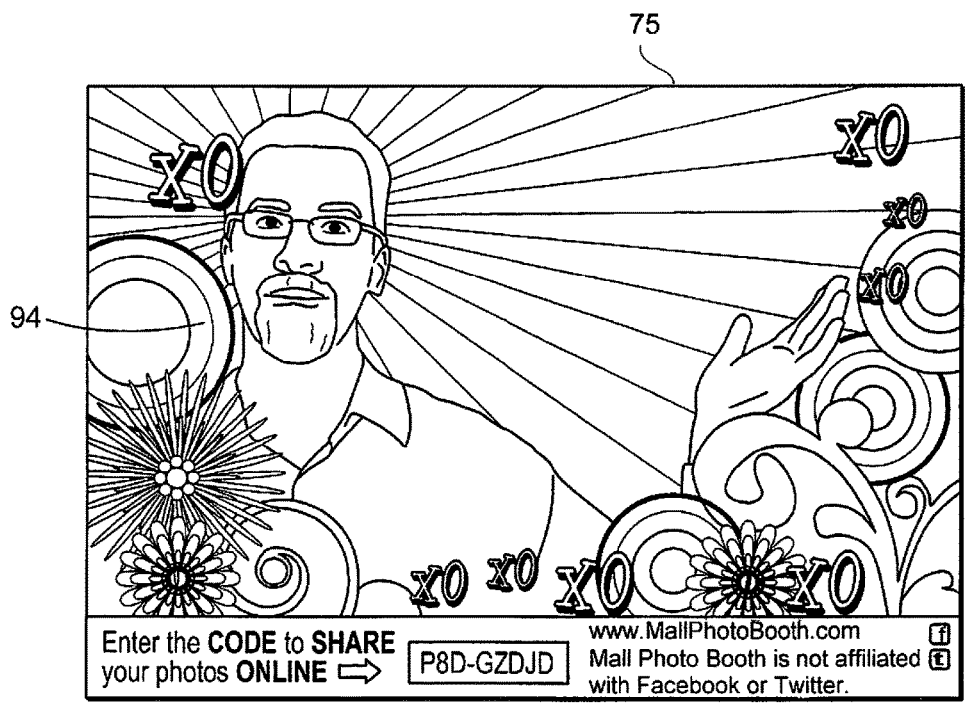

A twelfth function 96 of the program-controlled apparatus provides for storage of the data comprising the enhanced composite digital image in random access memory of the program-controlled apparatus. Alternatively or concurrently, the twelfth function provides for storage of the data to the program-controlled apparatus read-only memory 46, e.g., a hard drive. Tenth function 58 effects display to the one or more subjects of the enhanced composite digital image on the program-controlled apparatus display screen. The foregoing operations are illustrated generally and collectively by the process steps set forth in FIGS. 13-15. Programming of the program-controlled apparatus corresponding to a thirteenth function 97 then effects printing of one or more photographs 75 of enhanced composite digital image 94 from the printer. Exemplary digital photographs 75 representing enhanced composite digital images comprising data of selected digital photographs, digital foreground images, and digital background images are are shown in FIGS. 17-19.

Figure 20:
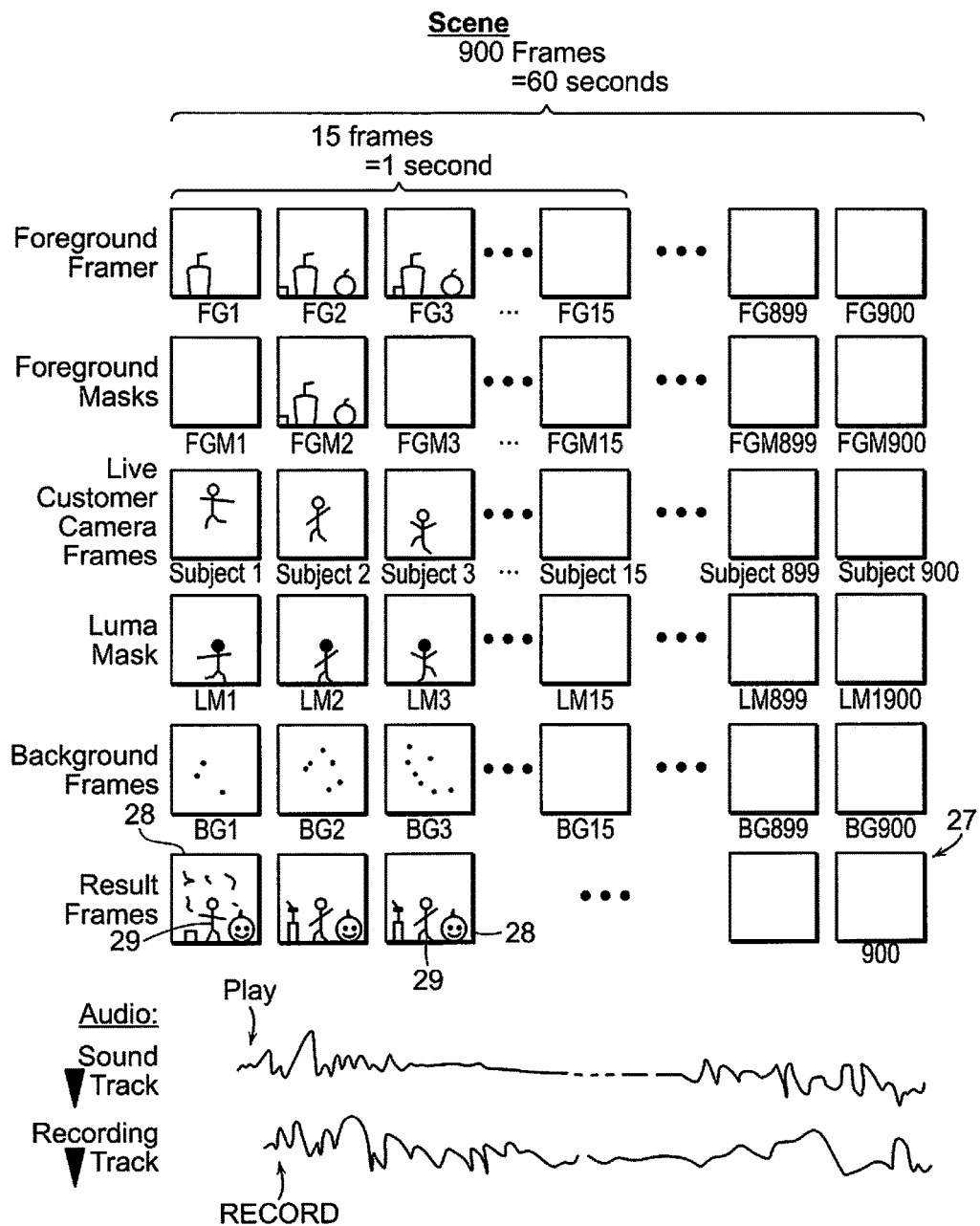
FIG. 20 shows schematically a process flow for production of a motion picture, according to one aspect of the disclosure, comprising a plurality of frames, in series, each frame including an image photographed in the photo booth, and operation of a ninth function which effects first through eighth functions for each of a selected number of frames per second.

Turning now to another aspect of this disclosure, a system or apparatus 100 is provided for producing a motion picture 27, illustrated in FIG. 20, comprising a plurality of frames 28, in series, each frame including an image 29 photographed in a photobooth employing a light-emitting backdrop. For example, the apparatus comprises photo booth 11 which includes housing 12 having entrance 13 on one side with movable closure member 14 for substantially enclosing one or more subjects 1 therein so as to minimize encroachment of exterior light. The photo booth also has seat 15 for supporting the one or more subjects to be photographed, first white light source 20 facing the one or more subjects for emitting first selected light intensity 21 upon the subjects, and second white light emitting source 30 facing generally the rear of the one or more subjects so as to define light-emitting photographic backdrop 31. Member 16, such as a multi-directional knob, is desirably included for adjusting the position of the one or more subjects relative to center point 17 of frame of reference 62.

The apparatus also includes photography unit 40 which comprises selected camera 41, program-controlled apparatus 42, e.g., a conventional high performance personal computer having random access memory 45 and read-only memory 46, printer 47, and first light source 20. The photography unit, activated such as upon receipt of payment-in-full from the one or more subjects, takes digital photograph 60 of objects within the frame of reference against the light-emitting photographic backdrop of the second white light emitting source. Data 63 comprising the digital photograph is stored in the random access memory of the program-controlled apparatus.

It is preferred that device 70 be provided for receiving a selected form of payment from the one or more subjects for the one or more photographs to be taken. According to one arrangement, the device is of a conventional, electronically operated, coin deposit and/or paper currency receiving type. Alternatively or concurrently, conventional credit card scanner 71 with keyboard type payment receiver is provided for accepting payment. Further in the alternative or concurrently therewith, activation member 72 (e.g., button, switch, lever or the like) is provided which, when pressed by one or more subjects, activates—separately from the payment receiving device—the photography unit to take the digital photograph. Such an activation member has been found advantageous, for instance, when the apparatus is to be operated in "free mode" (e.g., when one, two or all of the aforementioned arrangements are deactivated) as for use by one or more subjects at charitable events, weddings, promotions, and the like. Activation member 72 is also useful in the event of malfunction of one, two or all of the aforementioned arrangements for receiving payment. According to yet another arrangement, the activation, member is provided optionally to serve as an override of one, two or all of the aforementioned arrangements for receiving payment.

In addition, the photography unit 40 includes first member 18, e.g., an activation button, switch, lever or the like, and program-controlled apparatus 42 first function 48 for selection by one or more subjects 1 of desired digital background image 64, preferably from database 65 of multiple digital background images, for composing with images of the one or more subjects of which one or more digital photographs 60 are to be taken. By one arrangement, member or button 18 is pressed by the subject(s), thereby activating the first function of the program-controlled apparatus for selection of the digital background image. Second member 19, e.g., also an activation button, switch, lever or the like, is provided for activating second program-controlled apparatus function 49 and, thereby, enabling the one or more subjects to select frame 62 of reference, the contents of which are to be included in one or more photographs to be taken, and defining a plurality of objects 61 to be included in the frame for the one or more photographs to be taken. As those skilled in the art will appreciate, the first and second members (and exemplary first and second activation buttons, switches, levers or the like) may be separate or may refer to a common member (e.g., button, switch, lever) or like structure for activation of the first and second functions.

The program-controlled apparatus also includes third function 50 for applying first selected algorithm 80 pixel by pixel to data 63 comprising the digital photograph so as to create luma mask 66. Preferably, the first algorithm performs the following steps. First, threshold brightness value 36 correlated with second light emitting source 30 is determined. Then, for each pixel, it is determined whether its brightness is greater than or equal to the threshold brightness value, and, if so, it represents the subject and the corresponding pixel on the luma mask is assigned a first binary value of "0", a black color or an opaque appearance. If, on the other hand, the pixel brightness is less than the threshold brightness value, then it represents the background image and the corresponding pixel on the luma mask is assigned a second binary value of "1", a white color or a transparent appearance. The resulting luma mask generated pixel by pixel thereby delineates the subject with the color black (or opaque appearance) and the background with the color white (or transparent appearance).

In addition, the program-controlled apparatus has fourth function 51 for composing, using luma mask 66, data 63 comprising the digital photograph of the one or more subjects with data 68 comprising the digital background image. More specifically, second selected algorithm 81 is applied, pixel by pixel, so as to create a digital composite image 37 comprising both digital photograph 60 and digital background image 64. The second algorithm comprises the steps of determining whether the pixel has a first binary value of "0", a black color or an opaque appearance, or a second binary value of "1", a white color or a transparent appearance. If the pixel has the first binary value of "0", black color or opaque appearance, then the corresponding color of the pixel on the composite digital image is replaced with that of the corresponding digital subject image pixel. Whereas, if the pixel has the second binary value of "1", white color or transparent appearance, then the corresponding color of the pixel on the composite digital image is replaced with that of the corresponding digital background image pixel.

The program-controlled apparatus is further provided with fifth function 52 for effecting storage of data 69 comprising the resulting composite digital image of the one or more subjects and background image in random access memory 45 of program-controlled apparatus 42. Alternatively or concurrently therewith, the fifth function provides for storage of the data to the hard drive of the program-controlled apparatus. Sixth function 53 is additionally provided for effecting display to the one or more subjects of the composite digital image on program-controlled apparatus display screen 54.

Further in the alternative or concurrently therewith, the program-controlled apparatus is provided with seventh function 55 for data processing and production of enhanced composite digital image 73. The seventh function preferably includes third selected algorithm 82 which is applied pixel by pixel to data 69 comprising the composite digital image so as to remove visual artifacts and perform edge blending or feathering between edge data comprising the original digital photograph of the one or more subjects, and edge data comprising the original digital background image, which respective edge data borders and is in proximity to one another. Upon completion of the third algorithm, enhanced composite digital image 73 is produced.

Eighth function 56 of the program-controlled apparatus provides for storage of the data comprising the enhanced composite digital image in the random access memory of the program-controlled apparatus. Alternatively or concurrently, the eighth function provides for storage of the data to the hard drive of the program-controlled apparatus. The sixth function effects display to the one or more subjects of the enhanced composite digital image on the program-controlled apparatus display screen.

Figure 14:
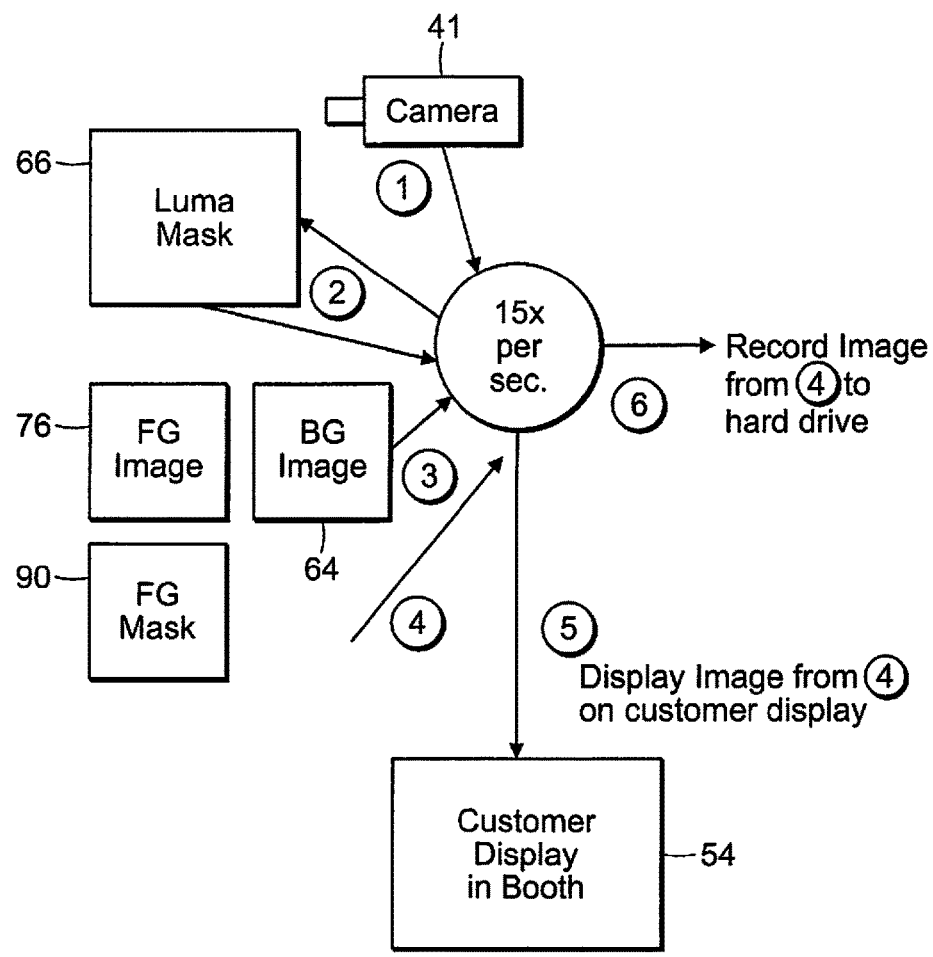
FIG. 14 is a flow diagram showing a method for photographing an image in a photo booth employing a light-emitting backdrop and composing, in series, a digital photograph, a background image and a foreground image, into a composite image so as to create a motion picture, in accordance with another aspect of the disclosure.

For producing a motion picture comprising a plurality of frames, in series, each frame including an image photographed in the photo booth, the program-controlled apparatus further includes programming corresponding to ninth function 57 which effects operation of the first through eighth functions for each of a selected number of frames per second. For example, as shown in FIGS. 14 and 20, if a picture quality of 15 frames per second is selected, according to the ninth function, each of the first through eighth functions is operated 15 times, in sequence, resulting in an enhanced composite digital image for each of the 15 frames.

The program-controlled apparatus is further programmed with tenth function 58 for performing the ninth function above for each one second time interval comprising the duration of a selected scene. In accordance with the example above, and assuming a scene duration of 30 seconds, the ninth function, i.e., operation of the first through eighth functions for each of 15 frames per second, is operated 30 times, thereby creating 450 enhanced composite digital images. Eleventh function 59 of the program-controlled apparatus effects storage of the data amassed, upon performing the ninth function and the tenth function for a selected scene, in the random access memory of the program-controlled apparatus and/or optionally to the program-controlled apparatus hard drive.

Moreover, program-controlled apparatus 42 has programming corresponding to twelfth function 96 for transfer of the data amassed upon performing the eleventh function to a selected device for digital playback, namely, for displaying a motion image comprising the data stored. The motion image comprises the enhanced composite digital image each time the first through the eighth function is performed, in real-time, and shows the subject(s) composed within the background scene.

Suitable digital playback devices include, but are not limited to, Smart Phones, Tablet Computers, I-pods, Desktop or Laptop Computers or like personal devices having appropriate conventional software or App for digital music playback. Suitable software includes, but is not limited to, Quicktime, DVD, RealPlayer, iTunes, iDVD, Windows Media Player, Blue-Ray and the like. Appropriate digital video playback formats include, but are not limited to, Quicktime, H.264, M-PEG 1, M-PEG 2, DVD, Blue-Ray, iTunes and the like.

Alternatively or concurrently, the twelfth function is programmed or compatible for use with online players including YouTube, Vimeo and the like. Thirteenth function 97 of the program-controlled apparatus enables the one or more subjects to print one or more photographs, or groups of photographs, of any of the enhanced composite digital images of the selected scene from printer 47.

Further in the alternative or concurrently therewith, the program-controlled apparatus is programmed with a fourteenth function 98 for displaying to the one or more subjects in the photo booth a motion image comprising the data stored, which comprises the enhanced composite digital image each time the first through the eighth function is performed, in real-time, showing the subject(s) composed within the background scene.

Optionally, and for the one or more subjects who may be less concerned about picture quality and/or do not wish to wait the amount of time it may take for the photography unit to compile hundreds or thousands of enhanced composite digital images, the program-controlled apparatus includes a quick movie function 99, in the alternative to the above-described arrangements or concurrently therewith, for compiling a motion picture using the composite digital image data, i.e., the non-enhanced version of the digital images. For instance, and more or less concurrently with operation of the fifth and sixth functions, The data amassed via the quick movie function is then utilized to produce the motion picture. Using programming of the ninth function, for each of a selected number of frames per second, the first through sixth functions are operated. Then, through operation of the tenth function, the ninth function, as curtailed above to the first through sixth functions, is operated for each one second time interval comprising the duration of a selected scene. By the eleventh function, the data amassed is stored, upon performing the curtailed ninth and tenth function for a selected scene, in the random access memory and/or optionally to the hard drive of the program-controlled apparatus.

In this manner, a motion picture comprised of the non-enhanced composite digital images may be played on the screen live, and in real-time, to the one or more subjects. Also as an option, the one or more subjects may choose to print one of the frames of the motion picture, for example, by operation of the thirteenth function described above. Although motion pictures may be produced (and stored, printed and/or transferred for digital playback) interchangeably with enhanced or non-enhanced composite digital images, it will be appreciated by those skilled in the art that enhanced composite digital images are preferred generally for permanent real-time storage and for print copies, within the spirit and scope of this disclosure.

Now with reference to yet another aspect of this disclosure, system or apparatus 100 is provided for producing motion picture 27 comprising plurality of frames 28, in series, each frame including image 29 photographed in photo booth 11 employing light-emitting backdrop 31. For example, the apparatus is provided as described above but with added photography unit features and computer based functions.

Figure 21:
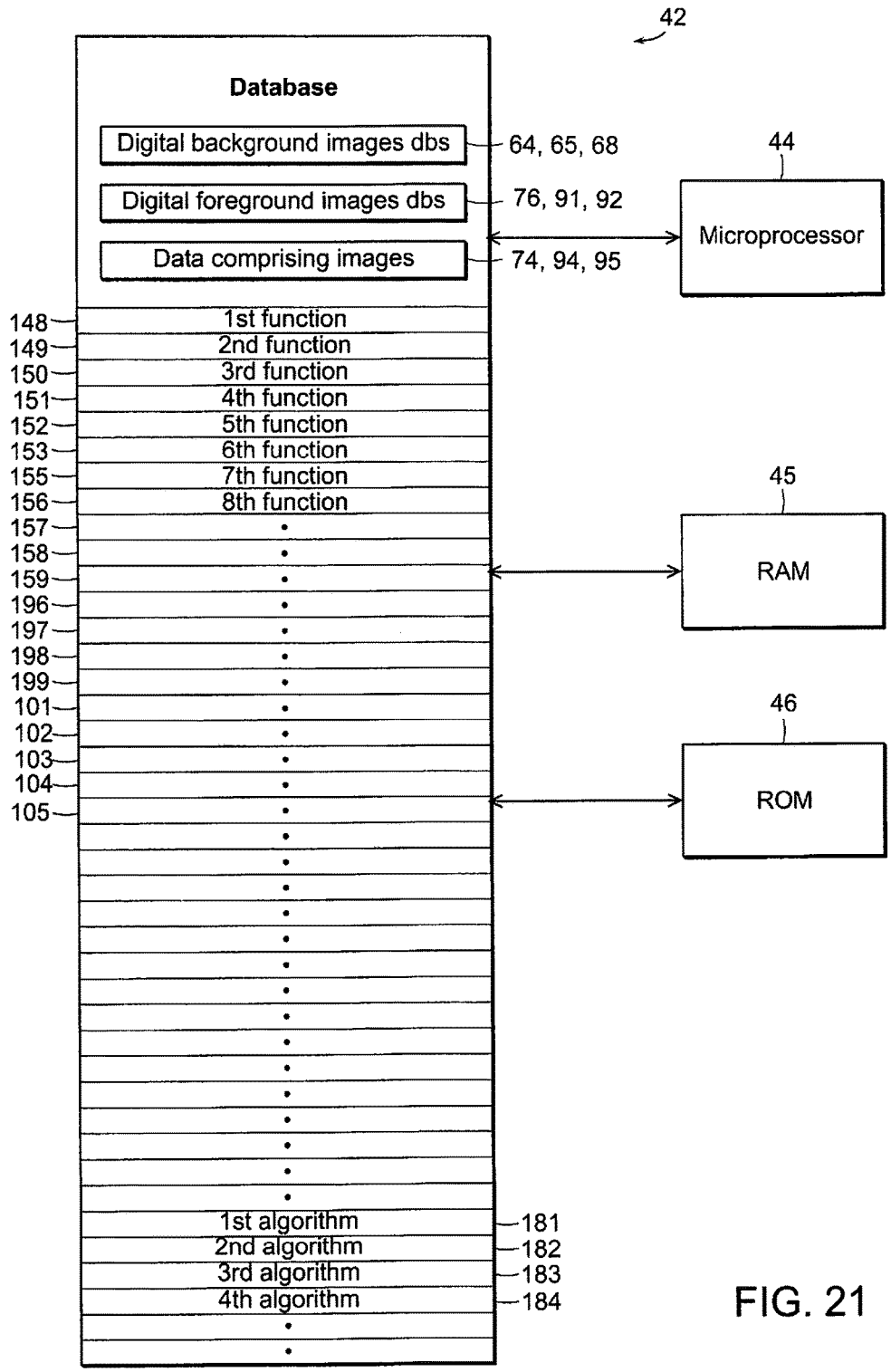
FIG. 21 illustrates schematically a program controlled apparatus and database, according to a further aspect of the disclosure.

For instance, the photography unit again includes first member 18, e.g., an activation button, switch, lever or the like, and program-controlled apparatus 42 a first function 148, illustrated in FIG. 21, for selection by one or more subjects 1 of desired digital background image 64, preferably from database 65 of multiple digital background images, for composing with images of the one or more subjects of which one or more digital photographs 60 are to be taken. The unit also has a second member 19, e.g., an activation button, switch, lever or the like, and the program-controlled apparatus a second function 149 for enabling the one or more subjects to select desired digital foreground image 76, preferably from a database 77 of multiple digital foreground images, for composing with the images of the one or more subjects, i.e., digital photograph 60, and with selected digital background image 64. In addition, the unit is provided with third member 26, e.g., an activation button, switch, lever or the like, and the program-controlled apparatus with a third function 150 for enabling the one or more subjects to select frame of reference 62. The contents of the frame are to be included in one or more photographs to be taken, thus defining a plurality of objects 61 to be included in the one or more photographs.

The program-controlled apparatus further includes a fourth function 151 for applying first selected algorithm 180 pixel by pixel to the data comprising the digital photograph so as to create luma mask 66. In particular, the first algorithm performs the following steps: First, it determines threshold brightness value 36 correlated with second light emitting source 30, and for each pixel, determines if its brightness is greater than or equal to the threshold brightness value. If so, then it represents the subject and the corresponding pixel on the luma mask is assigned a first binary value of "0", a black color or an opaque appearance. If, on the other hand, the pixel brightness is less than the threshold brightness value, then it represents the background image and the corresponding pixel on the luma mask is assigned a second binary value of "1", a white color or a transparent appearance. The resulting luma mask generated pixel by pixel thereby delineates the subject with the color black (or opaque appearance) and the background with the color white (or transparent appearance).

The program-controlled apparatus is provided with a fifth function 152 for inputting pre-generated data 79 representing selected digital foreground mask 90. The program-controlled apparatus preferably includes database 77 of multiple digital foreground images to facilitate the selection process. Such pre-generated data is selected due to its suitability for visual registration with the selected digital foreground image.

Supplementally, the program-controlled apparatus is programmed with a sixth function 153 for composing, using the luma mask, the data comprising the digital photograph of the one or more subjects with data comprising the digital background image. More particularly, a second selected algorithm 181 is applied, pixel by pixel, so as to create first digital composite image 78 comprising both the digital photograph and the digital background image. The second algorithm comprises the steps of determining whether the pixel has a first binary value of "0", a black color or an opaque appearance, or a second binary value of "1", a white color or a transparent appearance. If the pixel has the first binary value of "0", black color or opaque appearance, then the corresponding color of the pixel on the composite digital image is replaced with that of the corresponding digital subject image pixel. Whereas, if the pixel has the second binary value of "1", white color or transparent appearance, then the corresponding color of the pixel on the first composite digital image is replaced with that of the corresponding digital background image pixel.

Program-controlled apparatus 42 is further provided with a seventh function 155 as well for effecting storage of data 78 comprising the resulting first composite digital image of the one or more subjects and background image in random access memory 45 of the program-controlled apparatus. Alternatively or concurrently therewith, eighth function 156 provides for storage of the data to read-only memory 46, e.g., a hard drive, of the program-controlled apparatus.

Additionally included with programming of the program-controlled apparatus is a ninth function 157 for composing, using the foreground mask, the data comprising the digital foreground image with data 38 comprising the first digital composite image. This is accomplished desirably by applying a third selected algorithm 182 pixel by pixel so as to create second digital composite image 93 comprising data of the digital photograph, the digital foreground image, and the digital background image. According to one arrangement, the third algorithm comprises the steps of determining whether the pixel has a first binary value of "0", a black color or an opaque appearance, or a second binary value of "1", a white color or a transparent appearance. If the pixel has the first binary value of "0", black color or opaque appearance, then the corresponding color of the pixel on the composite digital image is replaced with that of the corresponding digital foreground image pixel. If, on the other hand, the pixel has the second binary value of "1", white color or transparent appearance, then the corresponding color of the pixel on the composite digital image is replaced with that of the corresponding first digital composite image pixel. A tenth function 158 is provided as well for effecting display to the one or more subjects of the composite digital image on program-controlled apparatus display screen 54.

Further in the alternative or concurrently therewith, the program-controlled apparatus is provided with an eleventh function 159 for data processing and production of an enhanced composite digital image. The eleventh function desirably includes a fourth selected algorithm 183 which is applied pixel by pixel to the data comprising the composite digital image so as to remove visual artifacts and perform edge blending or feathering between edge data comprising the original digital photograph of the one or more subjects, and edge data comprising the original digital background image, which respective edge data borders and is in proximity to one another. Upon completion of the fourth algorithm, enhanced composite digital image 73 is produced.

A twelfth function 196 of the program-controlled apparatus provides for storage of data 74 comprising the enhanced composite digital image in random access memory of the program-controlled apparatus. Alternatively or concurrently, the twelfth function provides for storage of the data to the program-controlled apparatus hard drive. Tenth function 158 effects display to the one or more subjects of the enhanced composite digital image on the display screen of the program-controlled apparaus. Programming of the program-controlled apparatus corresponding to a thirteenth function 197 then effects printing of one or more photographs of the enhanced composite digital image from the printer.

As illustrated in FIG. 20, producing a motion picture comprising a plurality of frames, in series, each frame including an image photographed in the photo booth, the program-controlled apparatus further includes programming corresponding to fourteenth function 198 which effects operation of the first through twelfth functions for each of a selected number of frames per second. For example, if a picture quality of 25 frames per second is selected, according to the fourteenth function, each of the first through twelfth functions is operated 25 times, in sequence, resulting in an enhanced composite digital image for each of the 25 frames.

The program-controlled apparatus is programmed with a fifteenth function 199 for performing the fourteenth function above for each one second time interval comprising the duration of a selected scene. In accordance with the example above, and assuming a scene duration of 60 seconds, the fourteenth function, i.e., operation of the first through twelfth functions for each of 25 frames per second, is operated 60 times, thereby creating 1500 enhanced composite digital images. A sixteenth function 101 of the program-controlled apparatus effects storage of the data amassed, upon performing the fourteenth function and fifteenth function for a selected scene, in the random access memory of the program-controlled apparatus and/or optionally to the hard drive.

Moreover, the program-controlled apparatus has programming corresponding to a sixteenth function 101 for transfer of the data amassed upon performing the fifteenth function to a selected device for digital playback, namely, for displaying a motion image comprising the data stored. The motion image comprises the enhanced composite digital image each time the first through the fourteenth function is performed, in real-time, and shows the subject(s) composed within the background scene.

A seventeenth function 102 of the program-controlled apparatus enables the one or more subjects to print one or more photographs, or groups of photographs, of any of the enhanced composite digital images of the selected scene from the printer. Further in the alternative or concurrently therewith, the program-controlled apparatus is programmed with an eighteenth function 103 for displaying to the one or more subjects in the photo booth a motion image comprising the data stored, which comprises the enhanced composite digital image each time the first through the eighth function is performed, in real-time, showing the subject(s) composed within the background scene.

Alternatively or concurrently, the photography unit includes a fourth member 84 and the program-controlled apparatus includes a nineteenth function 104 for enabling the one or more subjects to (i) select an audio sound track and/or recording stored in the random access memory of the program-controlled apparatus, (ii) save the stored data to the hard drive of the program-controlled apparatus, (iii) incorporate the sound track and/or recording in synch, and/or optionally not in synch, with the data stored, which comprises the enhanced composite digital images provided upon operation of the fifteenth function, and (iv) display the motion image comprising the data stored in synch, and/or optionally not in synch, with playing of the audio track and/or recording in real-time using a sixth member, e.g., speakers 86.

In the alternative or concurrently therewith, the photography unit includes a fifth member 85, e.g., a microphone, and the program-controlled apparatus includes a twentieth function 105 for enabling one or more subjects to record and input one or more selected sounds, to store the sounds input in the random access memory of the program-controlled apparatus and optionally save the stored sound data to the hard drive of the program-controlled apparatus, to incorporate and optionally synchronize the stored sound data with the data stored, which comprises enhanced composite digital images 73 provided upon operation of fifteenth function 199, and to display the motion image comprising the data stored optionally in synch with playing of the stored sound data in real-time.

Turning now to still another aspect of this disclosure, a method is provided for photographing an image in a photo booth employing a light-emitting backdrop. Initially, one or more users or subjects are located in a photo booth at a selected location for photographing. The photo booth preferably includes a housing with an entrance on one side having a movable closure member such as a black curtain for substantially enclosing the one or more subjects therein so as to minimize encroachment of exterior light, and a seat for supporting the one or more subjects to be photographed. Also provided are a first white light source facing the one or more subjects for emitting a first selected light intensity upon the subjects, and a second white light emitting source facing generally the rear of the one or more subjects so as to provide a light-emitting photographic backdrop.

Next, and optionally, the one or more subjects selects preferably from a database of multiple digital background images a desired digital background image, preferably from a database of multiple digital background images, for composing with images of one or more subjects of which one or more photographs are to be taken. The background image selected is read from the program-controlled apparatus hard drive into random access memory. Using a selected preview window, the contents of which are to be included in one or more photographs to be taken, the one or more subjects define a plurality of objects to be included in the window for the one or more photographs to be taken. The position of the one or more subjects is adjusted relative to a center point of the preview window.

A selected form of payment, for example, a conventional credit card, debit card, arcade coins, arcade debit card, or currency, is then input for the one or more photographs to be taken. Upon receipt of payment-in-full, a photography unit is activated. The unit comprises a selected camera, program-controlled apparatus running a selected operating system and having a microprocessor, random access memory and read-only memory, a printer, and the first light source so as to take a digital photograph of the objects within the frame of reference against the light-emitting photographic backdrop of the second white light emitting source. In a preferred embodiment, the illumination intensity of the second light emitting source is adjusted such the illumination intensity as seen by the camera is greater than the illumination of the first light source reflecting off the subject(s). In other words, the brightness of the backdrop must exceed the brightness of reflected light on the subject(s). This is considered generally necessary to allow the "threshold" algorithm to be performed. Data comprising the digital photograph is stored in the random access memory of the program-controlled apparatus.

A first selected algorithm, for example, is then applied, pixel by pixel, to the data comprising the digital photograph so as to create a luma mask. The algorithm preferably comprises the steps of determining a threshold brightness value correlated with the second light emitting source, and then for each pixel, determining if its brightness is greater than or equal to the threshold brightness value. If the pixel brightness is greater or equal, then it represents the subject and the corresponding pixel on the luma mask is assigned a first binary value of "0", a black color or an opaque appearance, whereas if the pixel brightness is less than the threshold brightness value, then it represents the background image and the corresponding pixel on the luma mask is assigned a second binary value of "1", a white color or a transparent appearance. The resulting luma mask generated pixel by pixel thereby delineates the subject with the color black (or opaque appearance) and the background with the color white (or transparent appearance).

Using the luma mask, the data comprising the digital photograph of the one or more subjects is composed with data comprising the digital background image, by applying, for instance, a second selected algorithm, pixel by pixel, so as to create a digital composite image comprising both the digital photograph of the one or more subjects and the digital background image. In one embodiment, the algorithm comprises the steps of determining whether the pixel has a first binary value of "0", a black color or an opaque appearance, or a second binary value of "1", white color or transparent appearance, and if the pixel has the first binary value of "0", black color or opaque appearance, then the corresponding color of the pixel on the composite digital image is replaced with that of the corresponding digital subject image pixel. On the other hand, if the pixel has the second binary value of "1", a white color or a transparent appearance, then the corresponding color of the pixel on the composite digital image is replaced with that of the corresponding digital background image pixel. The data comprising the resulting composite digital image of the one or more subjects and background image is stored in random access memory of the program-controlled apparatus and optionally saved to the hard drive. The composite digital image is then shown to the one or more subjects on a display screen of the program-controlled apparatus.

Thereafter, and optionally, a third selected algorithm, for example, is applied, also pixel by pixel, to the data comprising the composite digital image so as to remove visual artifacts and/or perform edge blending or feathering between edge data comprising the original digital photograph of the one or more subjects, and edge data comprising the original digital background image, which respective edge data borders and is in proximity to one another, so as to produce an enhanced composite digital image. The data comprising the enhanced composite digital image is stored in random access memory of the program-controlled apparatus and optionally saved to the hard drive. One or more photographs corresponding to the enhanced composite digital image are then printed from the printer.

Alternatively or concurrently, another method is provided for photographing an image in a photo booth employing a light-emitting backdrop. According to one embodiment, the method comprises the steps of positioning one or more users or subjects in a photo booth at a selected location for photographing. As before, the photo booth preferably includes a housing having an entrance on one side with movable closure member for substantially enclosing the one or more subjects therein so as to minimize encroachment of exterior light, and a seat for supporting the one or more subjects to be photographed. A first white light source faces the one or more subjects for emitting a first selected light intensity upon the subjects, and a second white light emitting source faces generally the rear of the one or more subjects so as to provide a light-emitting photographic backdrop.

Optionally, a desired digital background image is selected, preferably from a database of multiple digital background images, for composing with images of one or more subjects of which one or more photographs are to be taken. The background image selected is read from a hard drive of the program-controlled apparatus into random access memory. In addition, a desired digital foreground image is selected, preferably from a database of multiple digital foreground images, for composing with both the images of the one or more subjects and the selected digital background image. Data corresponding to a digital foreground mask is optionally generated from the digital foreground image preliminarily to the method of the disclosure, as described above, or upon selection of the desired digital foreground, such data being generated, for instance, through application of a first selected algorithm pixel by pixel to the data comprising the digital foreground image and read from the hard drive into random access memory of the program-controlled apparatus. Notably, according to one aspect of the disclosure, a digital background mask is considered unnecessary for the digital background image.

Next, using a selected frame, the contents of which are to be included in one or more photographs to be taken, a plurality of objects to be included in the frame for the one or more photographs to be taken are defined. The position of the one or more subjects is adjusted relative to a center point of the frame of reference.

A selected form of payment is then input for the one or more photographs to be taken. Upon receipt of payment-in-full, a photography unit is activated. Again, the unit comprises a selected camera, program-controlled apparatus having random access memory and read-only memory, a printer, and light source so as to take a digital photograph of the objects within the frame of reference against the light-emitting photographic backdrop of the second white light emitting source. Data comprising the digital photograph is stored in the random access memory of the program-controlled apparatus.

A second selected algorithm, for example, is applied, pixel by pixel, to the data comprising the digital photograph so as to create a luma mask. The second algorithm preferably comprises the steps of determining a threshold brightness value correlated with the second light emitting source, and then for each pixel, determining if its brightness is greater than or equal to the threshold brightness value. The threshold brightness value is preferably correlated with the background light intensity, which in the present embodiment is selected to be the brightest part of the image. If the pixel brightness is greater or equal, then it represents the subject and the corresponding pixel on the luma mask is assigned a first binary value of "0", a black color, or an opaque appearance. If, on the other hand, the pixel brightness is less than the threshold brightness value, then it represents the background image and the corresponding pixel on the luma mask is assigned a second binary value of "1", a white color, or a transparent appearance. The resulting luma mask generated pixel by pixel thereby delineates the subject with the color black (or opaque appearance) and the background with the color white (or transparent appearance).

Using the luma mask, the data comprising the digital photograph of the one or more subjects is composed with data comprising the digital background image, by applying, for instance, a third selected algorithm pixel by pixel so as to create a first digital composite image comprising both the digital photograph and the digital background image. It is preferred that the algorithm comprise the steps of determining whether the pixel has a first binary value of "0", a black color or an opaque appearance, or a second binary value of "1", a white color or a transparent appearance. If the pixel has the first binary value of "0", a black color or an opaque appearance, then the corresponding color of the pixel on the first composite digital image is replaced with that of the corresponding digital subject image pixel. Whereas, if the pixel has the second binary value of "1", a white color or a transparent appearance, then the corresponding color of the pixel on the first composite digital image is replaced with that of the corresponding digital background image pixel. The data comprising the first composite digital image of the one or more subjects and background image is then stored in random access memory of the program-controlled apparatus and optionally saved to the hard drive.

Using the foreground mask, the data comprising the digital foreground image is composed with data comprising the first digital composite image, by applying a fourth selected algorithm pixel by pixel so as to create a second digital composite image comprising data of the digital photograph, the digital foreground image, and the digital background image. The fourth algorithm comprises the steps of determining whether the pixel has a first binary value of "0", a black color or an opaque appearance, or a second binary value of "1", white color or transparent appearance. If the pixel has the first binary value of "0", black color or opaque appearance, then the corresponding color of the pixel on the composite digital image is replaced with that of the corresponding digital foreground image pixel. However, if the pixel has the second binary value of "1", a white color or a transparent appearance, then the corresponding color of the pixel on the composite digital image is replaced with that of the corresponding first digital composite image pixel. The resulting composite digital image is then shown to the one or more subjects on a display screen of the program-controlled apparatus.

Thereafter, and optionally, a fifth selected algorithm is applied, pixel by pixel, to the data comprising the composite digital image so as to remove visual artifacts and perform edge blending or feathering between edge data comprising the original digital photograph of the one or more subjects, and edge data comprising the original digital background image, which respective edge data borders and is in proximity to one another, so as to produce an enhanced composite digital image. The data comprising the enhanced composite digital image is stored in random access memory of the program-controlled apparatus and optionally saved to the hard drive. One or more photographs corresponding to the enhanced composite digital image are then printed from the printer.

Further in the alternative or concurrently therewith, there is provided a method of producing a motion picture comprising a plurality of frames, in series, each frame including an image photographed in a photo booth employing a light-emitting backdrop, as described above. The method comprises the steps of initially positioning one or more users or subjects in a photo booth at a selected location for photographing. Once again, the photo booth preferably includes a housing having an entrance on one side with movable closure member for substantially enclosing the one or more subjects therein so as to minimize encroachment of exterior light, and a seat for supporting the one or more subjects to be photographed. A first white light source faces the one or more subjects for emitting a first selected light intensity upon the subjects, and a second white light emitting source faces generally the rear of the one or more subjects so as to provide a light-emitting photographic backdrop. Next, and optionally, a desired digital background image is selected, preferably from a database of multiple digital background images, for composing with images of one or more subjects of which one or more photographs are to be taken. Using a selected frame, the contents of which are to be included in the one or more photographic frames are to be taken, a plurality of objects to be included in the frame for the one or more photographs to be taken are defined.

The one or more subjects are positioned relative to a center point of the frame of reference. A selected form of payment is then input for the one or more photographs to be taken. Upon receipt of payment-in-full, a photography unit is activated. The unit similarly comprises a selected camera, program-controlled apparatus having random access memory and read-only memory, a printer, and light source so as to take a digital photograph of the objects within the frame of reference against the light-emitting photographic backdrop of the second white light emitting source. Data comprising the digital photograph is stored in the random access memory of the program-controlled apparatus.

Next, a first selected algorithm, for example, is applied pixel by pixel to the data comprising the digital photograph so as to create a luma mask. In one arrangement, the algorithm comprises the steps of determining a threshold brightness value correlated with the second light emitting source, and then, for each pixel, determining if its brightness is greater than or equal to the threshold brightness value. If it is greater or equal, then it represents the subject and the corresponding pixel on the luma mask is assigned a first binary value of "0", a black color or an opaque appearance. On the other hand, if the pixel brightness is less than the threshold brightness value, then it represents the background image and the corresponding pixel on the luma mask is assigned a second binary value of "1", a white color or a transparent appearance. Generally speaking, the resulting luma mask generated upon application of this algorithm, pixel by pixel, delineates the subject with the color black (or opaque appearance) and the background with the color white (or transparent appearance).

Using the luma mask, the data comprising the digital photograph of the one or more subjects is composed with data comprising the digital background image. This is accomplished, for instance, by applying a second selected algorithm pixel by pixel so as to create a digital composite image comprising both the digital photograph and the digital background image. According to one embodiment, the algorithm comprises the steps of determining whether the pixel has a first binary value of "0", a black color or an opaque appearance, or a second binary value of "1", a white color or a transparent appearance, and if the pixel has the first binary value of "0", black color or opaque appearance, then the corresponding color of the pixel on the composite digital image is replaced with that of the corresponding digital subject image pixel. If, however, the pixel has the second binary value of "1", white color or transparent appearance, then the corresponding color of the pixel on the composite digital image is replaced with that of the corresponding digital background image pixel. The data comprising the resulting composite digital image of the one or more subjects and background image is then stored in random access memory of the program-controlled apparatus, optionally saved to the hard drive, and the composite digital image is shown to the one or more subjects on a display screen of the program-controlled apparatus.

Next, for each of a selected number of frames comprising a one second interval of the motion picture to be produced, e.g., for each of 15 frames comprising a one second interval of a selected scene, the above-described steps are performed. In turn, the steps performed for each of the selected one second time interval are then performed for each second of the multi-second motion picture being produced, for instance, for each second of a 90 second motion picture.

The data amassed upon each of the aforementioned steps corresponding to a selected scene is then stored in random access memory, and optionally saved to the hard drive for subsequent transfer to a selected device for digital playback. Notably, as the digital composite image is shown to the subject in real-time on the program-controlled apparatus display, the subject appears as a part of a motion picture. According to one arrangement, and by way of example, a 400 frame movie segment is produced where one or more subjects appear as passengers in a moving car. In another example, a 20 frame segment is produced wherein the one or more subjects appear amongst a moving background and/or foreground of simulated falling leaves.

Thereafter, and optionally, a third selected algorithm is applied, pixel by pixel, to the data comprising the composite digital image so as to remove visual artifacts and/or perform edge blending or feathering between edge data comprising the original digital photograph of the one or more subjects, and edge data comprising the original digital background image, which respective edge data borders and is in proximity to one another, so as to produce an enhanced composite digital image. Last, the data comprising the enhanced composite digital image is stored in random access memory of the program-controlled apparatus and optionally saved to the hard drive.

In accordance with yet another aspect of the disclosure, there is provided a method of producing a motion picture comprising a plurality of frames, in series, each frame including an image photographed in a photo booth employing a light-emitting backdrop. In accordance with one embodiment, the method comprises the steps of positioning one or more users or subjects in a photo booth at a selected location for photographing. As before, the photo booth includes a housing having an entrance on one side with movable closure member for substantially enclosing the one or more subjects therein so as to minimize encroachment of exterior light, and a seat for supporting the one or more subjects to be photographed. A first white light source is provided facing the one or more subjects for emitting a first selected light intensity upon the subjects, and a second white light emitting source is positioned facing generally the rear of the one or more subjects so as to provide a light-emitting photographic backdrop.

Next, and optionally, a desired digital background image is selected, preferably from a database of multiple digital background images, preferably from a database of multiple digital background images for composing with images of one or more subjects of which one or more photographs are to be taken. Similarly, a desired digital foreground image is selected, desirably from a database of multiple background images, for composing with the images of the one or more subjects and with the selected digital background image. Data corresponding to a digital foreground mask is optionally generated from the digital foreground image preliminarily to the method of the disclosure, as described above, or upon selection of the desired digital foreground, such data being generated, for instance, through application of a first selected algorithm pixel by pixel to the data comprising the digital foreground image, stored in random access memory of the program-controlled apparatus, and optionally saved to the hard drive.

Using a selected frame, the contents of which are to be included in one or more photographs to be taken, a plurality of objects to be included in the frame for the one or more photographs to be taken are defined, e.g., by selection of the one or more subjects. The position of the one or more subjects is adjusted relative to a center point of the frame of reference.

A selected form of payment is then input for the one or more photographs to be taken and, upon receipt of payment-in-full, a photography unit is activated. The unit comprises, for example, a selected camera, program-controlled apparatus having random access memory and read-only memory, a printer, and light source so as to take a digital photograph of the objects within the frame of reference against the light-emitting photographic backdrop of the second white light emitting source. Data comprising the digital photograph is stored in the random access memory of the program-controlled apparatus.

Next, a second selected algorithm is applied, pixel by pixel, to the data comprising the digital photograph so as to create a luma mask. The second algorithm comprises the steps of determining a threshold brightness value correlated with the second light emitting source, and then for each pixel, determining if its brightness is greater than or equal to the threshold brightness value. If the pixel brightness is greater or equal, then it represents the subject and the corresponding pixel on the luma mask is assigned a first binary value of "0", a black color or an opaque appearance, whereas if the pixel brightness is less than the threshold brightness value, then it represents the background image and the corresponding pixel on the luma mask is assigned a second binary value of "1", a white color or a transparent appearance. The resulting luma mask generated pixel by pixel thereby delineates the subject with the color black (or opaque appearance) and the background with the color white (or transparent appearance).

Using the luma mask, the data comprising the digital photograph of the one or more subjects is composed with data comprising the digital background image, by applying a third selected algorithm pixel by pixel so as to create a first digital composite image comprising both the digital photograph and the digital background image. The third algorithm comprises, for instance, the steps of determining whether the pixel has a first binary value of "0", a black color or an opaque appearance, or a second binary value of "1", a white color or a transparent appearance, and if the pixel has the first binary value of "0", black color or opaque appearance, then the corresponding color of the pixel on the first composite digital image is replaced with that of the corresponding digital subject image pixel. Whereas, if the pixel has the second binary value of "1", white color or transparent appearance, then the corresponding color of the pixel on the first composite digital image is replaced with that of the corresponding digital background image pixel. The data comprising the first composite digital image of the one or more subjects and background image is then stored in random access memory of the program-controlled apparatus and optionally saved to the hard drive.

Using the foreground mask, the data comprising the digital foreground image is composed with data comprising the first digital composite image, by applying a fourth selected algorithm, pixel by pixel, so as to create a second digital composite image. The second digital composite image comprises data of the digital photograph, the digital foreground image, and the digital background image. The fourth algorithm preferably comprises the steps of determining whether the pixel has a first binary value of "0", a black color or an opaque appearance, or a second binary value of "1", a white color or a transparent appearance. If the pixel has the first binary value of "0", black color or opaque appearance, then the corresponding color/appearance of the pixel on the composite digital image is replaced with that of the corresponding digital foreground image pixel. If, on the other hand, the pixel has the second binary value of "1", white color or transparent appearance, then the corresponding color of the pixel on the composite digital image is replaced with that of the corresponding first digital composite image pixel. The resulting second composite digital image is then shown to the one or more subjects on a display screen of the program-controlled apparatus.

Subsequently, for each of a selected number of frames comprising a one second interval of the motion picture to be produced, e.g., for each of 15 frames comprising a one second interval of a selected scene, the above-described steps are performed in a repetitive loop. In turn, the steps performed for each of the selected one second time interval are then performed for each second of the multi-second motion picture being produced, for instance, for each second of a 90 second motion picture, also in a repetitive loop. The data amassed upon each of the aforementioned steps corresponding to a selected scene is then stored in random access memory, and optionally saved to the hard drive for subsequent transfer to a selected device for digital playback, e.g., via download from a Web site. Notably, as the digital composite image is shown to the subject in real-time on the program-controlled apparatus display, the subject appears as a part of a motion picture.

Thereafter, and optionally, a fifth selected algorithm, for example, is applied pixel by pixel to the data comprising the composite digital image so as to remove visual artifacts and/or perform edge blending or feathering between edge data comprising the original digital photograph of the one or more subjects, and edge data comprising the original digital background image, which respective edge data borders and is in proximity to one another, so as to produce an enhanced composite digital image. The data comprising the enhanced composite digital image is stored in random access memory of the program-controlled apparatus and optionally saved to the hard drive.

Further in the alternative or concurrently therewith, for each frame processed according to the disclosure above, e.g., the unique image for each matching live frame, a corresponding digital sound track is added or played in synch or not in synch therewith, according to methodology described above. Still further in the alternative or concurrently, the program-controlled apparatus includes a typical PC microphone and suitable digital audio recording and processing software, e.g., Linux arecord and aplay, for recording voice or other sound effects provided by the one or more subjects concurrently with capture of each digital photographic image for playing with a corresponding temporal frame of the still photo or motion picture. Data corresponding to the digital audio sound track and/or recording, e.g., a subject's voice over a music video, is stored in the hard drive for transfer with corresponding video image data for digital playback.

Though the disclosure has been shown and described herein with respect to selected components and functions, those skilled in the art will appreciate that other components may be utilized and functions performed, alternatively or concurrently therewith, giving consideration to the purpose for which the disclosure is intended. Generally speaking, where components and functions are not specifically identified, it is understood that conventional components and functions may be utilized, as appropriate.

Various modifications and alterations may be appreciated based on a review of this disclosure. These changes and additions are intended to be within the scope and spirit of thereof.

What is claimed is:

1. An apparatus for photographing an image in a photo booth, which comprises:
   a photo booth including a housing having an entrance on one side with movable closure member for substantially enclosing one or more users or subjects therein so as to minimize encroachment of exterior light;
   a seat for supporting the one or more subjects to be photographed;
   a first white light source facing the one or more subjects for emitting a first selected light intensity upon the subjects; and
   a second white light emitting source facing generally the rear of the one or more subjects so as to provide a light-emitting photographic backdrop;
   a device for receiving a selected form of payment from the one or more subjects for the one or more photographs to be taken;
   a photography unit comprising a selected camera, a program-controlled apparatus having random access memory and read-only memory, a printer, and the first light source, the photography unit, upon activation by receipt of payment-in-full from the one or more subjects, taking a digital photograph of objects within the frame of reference against the light-emitting photographic backdrop of the second white light emitting source, data comprising the digital photograph being stored in random access memory of the program-controlled apparatus;
   the unit further including a first member and the program-controlled apparatus a first function for selection by the one or more subjects of a desired digital background image for composing with images of one or more subjects of which one or more photographs are to be taken; and a second member and function, respectively, for enabling the one or more subjects to select a frame, the contents of which are to be included in one or more photographs to be taken, defining a plurality of objects to be included in the frame for the one or more photographs to be taken;
   a member for adjusting the position of the one or more subjects relative to a center point of the frame of reference;
   the program-controlled apparatus including a third function for applying a first selected algorithm pixel by pixel to the data comprising the digital photograph so as to create a luma mask, the algorithm performing the steps of determining a threshold brightness value correlated with the second light emitting source, and then for each pixel, determining if its brightness is greater than or equal to the threshold brightness value, and if so, it represents the subject and the corresponding pixel on the luma mask is assigned a first binary value of "0", a black color or an opaque appearance, whereas if the pixel brightness is less than the threshold brightness value, then it represents the background image and the corresponding pixel on the luma mask is assigned a second binary value of "1", a white color or a transparent appearance, the resulting luma mask generated pixel by pixel thereby delineating the subject with the color black (or opaque appearance) and the background with the color white (or transparent appearance);

a fourth function for composing, using the luma mask, the data comprising the digital photograph of the one or more subjects with data comprising the digital background image, by applying a second selected algorithm pixel by pixel so as to create a digital composite image comprising both the digital photograph and the digital background image, the algorithm comprising the steps of determining whether the pixel has a first binary value of "0", a black color or an opaque appearance, or a second binary value of "1", a white color or a transparent appearance, and if the pixel has the first binary value of "0", black color or opaque appearance, then the corresponding color of the pixel on the composite digital image is replaced with that of the corresponding digital subject image pixel, whereas if the pixel has the second binary value of "1", white color or transparent appearance, then the corresponding color of the pixel on the composite digital image is replaced with that of the corresponding digital background image pixel;

a fifth function for storage of the data comprising the resulting composite digital image of the one or more subjects and background image in random access memory of the program-controlled apparatus and optionally saving the stored data to a hard drive of the program-controlled apparatus;

a sixth function for showing to the one or more subjects the composite digital image on a display screen of the program-controlled apparatus;

a seventh function for application of a third selected algorithm pixel by pixel to the data comprising the composite digital image so as to remove visual artifacts and perform edge blending or feathering between edge data comprising the original digital photograph of the one or more subjects, and edge data comprising the original digital background image, which respective edge data borders and is in proximity to one another, so as to produce an enhanced composite digital image;

an eighth function for storage of the data comprising the enhanced composite digital image in random access memory of the program-controlled apparatus and optionally saving the stored data to the hard drive; and a ninth function for printing one or more photographs of the enhanced composite digital image from the printer.

* * * * *